US011628365B2

(12) United States Patent
Sensui

(10) Patent No.: US 11,628,365 B2
(45) Date of Patent: Apr. 18, 2023

(54) INFORMATION PROCESSING SYSTEM, STORAGE MEDIUM, INFORMATION PROCESSING APPARATUS AND INFORMATION PROCESSING METHOD

(71) Applicant: NINTENDO CO., LTD., Kyoto (JP)

(72) Inventor: Kazuyoshi Sensui, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 197 days.

(21) Appl. No.: 16/717,260

(22) Filed: Dec. 17, 2019

(65) Prior Publication Data
US 2020/0197812 A1   Jun. 25, 2020

(30) Foreign Application Priority Data
Dec. 19, 2018  (JP) .............................. JP2018-237398

(51) Int. Cl.
*A63F 13/69* (2014.01)
*A63F 13/537* (2014.01)
*A63F 13/79* (2014.01)
*A63F 13/335* (2014.01)

(52) U.S. Cl.
CPC ............ *A63F 13/69* (2014.09); *A63F 13/335* (2014.09); *A63F 13/537* (2014.09); *A63F 13/79* (2014.09); *A63F 2300/575* (2013.01); *A63F 2300/609* (2013.01)

(58) Field of Classification Search
CPC ........ A63F 13/69; A63F 13/79; A63F 13/335; A63F 13/537; A63F 2300/575; A63F 2300/609
See application file for complete search history.

(56) References Cited

U.S. PATENT DOCUMENTS

| 4,306,232 A | * | 12/1981 | Burson ................. G05G 9/047 345/161 |
| 5,682,469 A | * | 10/1997 | Linnett ............... G06F 3/04817 345/473 |
| 8,088,007 B2 | * | 1/2012 | Tabata .................... A63F 13/35 463/42 |
| 8,133,116 B1 | * | 3/2012 | Kelly .................... A63F 13/537 463/31 |
| 8,137,194 B1 | * | 3/2012 | Kelly .................... A63F 13/537 463/31 |

(Continued)

FOREIGN PATENT DOCUMENTS

JP         2015-157028         9/2015

OTHER PUBLICATIONS

"Kenshi—Indie Spotlight—Part 26—Putting the workers to work" published Jul. 28, 2013. Source: https://www.youtube.com/watch?v=1mS43WTZzxU (Year: 2013).*

(Continued)

*Primary Examiner* — Steven J Hylinski
(74) *Attorney, Agent, or Firm* — Nixon & Vanderhye, PC

(57) ABSTRACT

A game apparatus functioning as a non-limiting example information processing apparatus includes a CPU that executes virtual game processing. A player makes a PC act in a place provided in a virtual space, and clears a quest issued by an NPC that the PC encountered. Then, a reward is given to the PC or player. Moreover, by displaying one or more quests issued by one or more NPCs by list, it is possible to clear a quest selected from the list. In this case, a reward is also given to the PC or player.

19 Claims, 19 Drawing Sheets

(56) References Cited

U.S. PATENT DOCUMENTS

| | | | | |
|---|---|---|---|---|
| 8,605,115 | B2* | 12/2013 | Dettinger | G06Q 90/00 |
| | | | | 345/633 |
| 8,608,570 | B1* | 12/2013 | Mahajan | A63F 13/85 |
| | | | | 463/42 |
| 8,858,338 | B2* | 10/2014 | Bethke | G06Q 30/02 |
| | | | | 463/42 |
| 8,972,369 | B2* | 3/2015 | Vignocchi | G06F 16/955 |
| | | | | 707/705 |
| 9,031,871 | B2* | 5/2015 | Hamilton, II | G06Q 10/087 |
| | | | | 705/28 |
| 9,101,833 | B2* | 8/2015 | Behmaram-Mosavat | |
| | | | | A63F 13/533 |
| 9,251,318 | B2* | 2/2016 | Hamilton, II | G06Q 50/10 |
| 9,539,512 | B1* | 1/2017 | Kim | A63F 13/56 |
| 10,874,947 | B2* | 12/2020 | Benedetto | A63F 13/35 |
| 11,077,374 | B2* | 8/2021 | Sano | A63F 13/12 |
| 2004/0143852 | A1* | 7/2004 | Meyers | A63F 13/822 |
| | | | | 463/43 |
| 2004/0266505 | A1* | 12/2004 | Keam | A63F 13/79 |
| | | | | 463/1 |
| 2007/0129148 | A1* | 6/2007 | Van Luchene | A63F 13/352 |
| | | | | 463/1 |
| 2011/0055734 | A1* | 3/2011 | Borst | A63F 13/358 |
| | | | | 715/757 |
| 2011/0165939 | A1* | 7/2011 | Borst | A63F 13/63 |
| | | | | 463/29 |
| 2012/0252570 | A1* | 10/2012 | Kwant | G06Q 50/01 |
| | | | | 463/43 |
| 2013/0217489 | A1* | 8/2013 | Bronstein Bendayan | |
| | | | | A63F 13/12 |
| | | | | 463/31 |
| 2014/0024462 | A1* | 1/2014 | Qiang | A63F 13/795 |
| | | | | 463/42 |
| 2014/0181062 | A1* | 6/2014 | Vignocchi | G06F 16/188 |
| | | | | 707/705 |
| 2014/0181820 | A1* | 6/2014 | Vignocchi | A63F 13/10 |
| | | | | 718/100 |
| 2014/0235326 | A1* | 8/2014 | Paracha | A63F 13/795 |
| | | | | 463/25 |
| 2015/0065241 | A1* | 3/2015 | McCarthy | G07F 17/3272 |
| | | | | 463/31 |
| 2016/0236087 | A1* | 8/2016 | McNeil | A63F 13/847 |
| 2017/0072313 | A1 | 3/2017 | Kinoshita et al. | |

OTHER PUBLICATIONS

"How to Build and Manage a Squad in Kenshi," by Tim White, published Dec. 11, 2018. Source: https://www.gameskinny.com/kykey/how-to-build-and-manage-a-squad-in-kenshi (Year: 2018).*

"Kenshi Review," by Alec Meer, Published Dec. 11, 2018. Source: https://www.rockpapershotgun.com/kenshi-review (Year: 2018).*

"Semi-Automated Grog Business in Town," by UmePatroclus, published Aug. 17, 2018. Source: https://www.reddit.com/r/Kenshi/comments/97zmh2/semiautomated_grog_business_in_town/ (Year: 2018).*

"FFXIV ARR: Retainer Ventures Guide," by Mrhappy1227, published Apr. 8, 2014. Source: https://www.youtube.com/watch?v=Qm3vbnuSHV4 (Year: 2014).*

Animal Crossing: pocket camp, https://ac-pocketcamp.com/ja-JP/site/about, 1 page, 2017.

Animal Crossing: pocket camp, https://ac-pocketcamp.com/en-US/site/about, 1 page, 2017.

Notification of Reason(s) for Refusal dated Jan. 28, 2020 in JP Application No. 2018 (9 pgs.) and translation (9 pgs.).

Daikoukai Jidai Online La Frontera available on the Windows platform Official Guide Book Jun. 12, 2006 version Data Skills, published by Koei Co., Ltd. on Feb. 11, 2007, First Edition, pp. 9, 25, 39, 64-65 (8 pgs.).

Suzuki Akihabara Housoushitsu Suzuki Akihabara LIVE, Dragon Quest Heroes II clearing all the quests #1 [DQH2 Trophy Complete Full Walkthrough Live], YouTube [online][video], Jun. 13, 2016 [searched on Jan. 20, 2020], Internet, URL, https://www.youtube.com/watch?v=TccIQzBnA4w (document showing well-known prior art).

Ryota Tanioka, Takashi Yoshino, Disaster Preparedness Egg: Disaster Preparedness. Social Network Game System Supporting Disaster Measures, Journal of Multimedia, Distributed, Cooperative, and Mobile Symposium (DICOMO2017), Information Processing Society of Japan Symposium Series, vol. 2017 No. 1 [CD-ROM], Japan, Information Processing Society of Japan, Jun. 2017, pp. 1259-1264, ISSN 1882-0840, received by Japan Patent Office on Jul. 31, 2017 (7 pgs.).

Shinsei Eoruzea Final Fantasy XIV, WeeklyFamitsu, published by Enterbrain, Inc., Aug. 29, 2013, vol. 28, Item 37, pp. 62, 72-73 (document showing well-known prior art) (5 pgs.).

New Danganronpa V3 Minna no Koroshiai Shin Gakki, WeeklyFamitsu, published by Kadokawa Corporation, Jan. 12, 2017, vol. 32, Item 4, pp. 170-171, 174, 180 (6 pgs.).

* cited by examiner

GAME SCREEN 100

MOVEMENT SELECTION SCREEN 250

INFORMATION PROCESSING SYSTEM, STORAGE MEDIUM, INFORMATION PROCESSING APPARATUS AND INFORMATION PROCESSING METHOD

CROSS REFERENCE OF RELATED APPLICATION

The disclosure of Japanese patent application No. 2018-237398 filed on Dec. 19, 2018 is incorporated by reference.

FIELD

This application describes an information processing system, a storage medium, an information processing apparatus and an information processing method, executing an event related to a non-player character in accordance with an operation by a user.

SUMMARY

It is a primary object of an embodiment(s) to provide a novel information processing system, storage medium, information processing apparatus and information processing method.

It is another object of the embodiment(s) to provide an information processing system, storage medium, information processing apparatus and information processing method, capable of improving usability.

A first embodiment is an information processing system comprising a processing circuit that includes at least one processor, wherein the processing circuit is configured to: control, based on an operation by a user, an action of a user object in one space among two or more virtual spaces or one area among two or more areas within a virtual space; execute, in first scene where an event object and the user object are arranged in a predetermined positional relationship in any one of the virtual spaces or the areas, an event related to the event object; present to the user, in a second scene different from the first scene, event object information related to a plurality of event objects respectively arranged in the two or more virtual spaces or in the two or more areas; execute the event related to the event object information in the second scene in response to an operation by the user to the event object information; and give a reward to the user if the event is executed in the first scene or if the event is executed in the second scene.

According to the first embodiment, since an event can be executed also in the second scene other than the first scene where an object is arranged, it becomes possible to execute an event in a scene that the user desired. That is, it is possible to improve usability.

Moreover, according to the first embodiment, since the event object information is presented to the user, it is possible to improve usability.

A second embodiment is the information processing system according to the first embodiment, wherein in the second scene, the event object information respectively related to the plurality of event objects arranged in the two or more virtual spaces are presented to the user in a selectable manner.

According to the second embodiment, execution of the event in the second scene becomes easier. That is, it is possible to improve usability.

A third embodiment is the information processing system according to the first embodiment, wherein the processing circuit is configured further to shift to the second scene based on an operation by the user in the first scene.

According to the third embodiment, since a scene can be shifted from the first scene to the second scene based on an operation by the user, it is possible to improve usability.

A fourth embodiment is the information processing system according to the first embodiment, wherein the processing circuit is configured further to shift to the first scene based on an operation by the user in the second scene.

According to the fourth embodiment, since a scene can be shifted from the second scene to the first scene based on an operation by the user, it is possible to improve usability.

A fifth embodiment is the information processing system according to the first embodiment, wherein the processing circuit is configured further to present to the user an icon indicating a virtual space in the second scene. The user object is arranged in the virtual space in response to an operation by the user to the icon in the second scene.

According to the fifth embodiment, since the user object can be arranged in a desired virtual space only by operating the icon, it is possible to improve usability.

A sixth embodiment is the information processing system according to the fifth embodiment, wherein two or more icons each indicating each of two or more virtual spaces are presented to the user in the second scene. The user object is arranged in the virtual space indicated by the icon operated by the user among the two or more icons.

According to the sixth embodiment, since the user object is arranged in the virtual space indicated by the icon operated by the user out of the two or more virtual spaces, it is possible to arrange the user object in the virtual space that user desired. That is, it is possible to improve usability.

A seventh embodiment is the information processing system according to the first embodiment, wherein information of the virtual space in which the event object related to the event object information is arranged is presented as the event object information.

According to the seventh embodiment, it is possible to easily know the virtual space where the event object is arranged.

An eighth embodiment is the information processing system according to the first embodiment, wherein an event related to the event object is executed in the first scene within a three-dimensional virtual space where the event object is arranged. An event related to the event object is executed in the second scene within a two-dimensional virtual space.

According to the eighth embodiment, since an event can be executed in the first scene within the three-dimensional virtual space or the second scene within the two-dimensional virtual space, depending on an operation of the user, a processing load of the processor or CPU can be reduced.

A ninth embodiment is the information processing system according to the first embodiment, wherein the processing circuit is configured further to restrict, if an event is executed in the first scene or if an event is executed in the second scene, execution of the event.

According to the ninth embodiment, since the user can select execution of the event in the first scene or in the second scene, it is possible to improve usability.

A tenth embodiment is the information processing system according to the first embodiment, wherein the processing circuit is configured further to make, if an event is executed in the first scene or if an event is executed in the second scene, an event different from the event be executable in the first scene and the second scene.

According to the tenth embodiment, once the event related to one event object is executed in the first scene or the second scene, an additional event can be executed. That is, it is possible to improve usability.

An eleventh embodiment is the information processing system according to the first embodiment, wherein the same reward is given to the user in either a case where an event is executed in the first scene or a case where the event is executed in the second scene.

According to the eleventh embodiment, since the same reward is given to the user irrespective of a means or method executing the event, the user should just execute the event by a desired means. That is, it is possible to improve usability.

A twelfth embodiment is the information processing system according to the first embodiment, wherein an item related to the event can be acquired by the user in the first scene.

A thirteenth embodiment is a non-transitory computer readable storage medium storing an information processing program that is executable by a computer comprising one or more processors, wherein the information processing program causes the one or more processors to: control, based on an operation by a user, an action of a user object in one space among two or more virtual spaces or one area among two or more areas within a virtual space; execute, in first scene where an event object and the user object are arranged in a predetermined positional relationship in any one of the virtual spaces or the areas, an event related to the event object; present to the user, in a second scene different from the first scene, event object information related to a plurality of event objects respectively arranged in the two or more virtual spaces or in the two or more areas; execute the event related to the event object information in the second scene in response to an operation by the user to the event object information; and give a reward to the user if the event is executed in the first scene or if the event is executed in the second scene.

A fourteenth embodiment is an information processing apparatus comprising one or more processors, wherein the one or more processors are configured to execute: controlling, based on an operation by a user, an action of a user object in one space among two or more virtual spaces or one area among two or more areas within a virtual space; executing, in first scene where an event object and the user object are arranged in a predetermined positional relationship in any one of the virtual spaces or the areas, an event related to the event object; presenting to the user, in a second scene different from the first scene, event object information related to a plurality of event objects respectively arranged in the two or more virtual spaces or in the two or more areas; executing the event related to the event object information in the second scene in response to an operation by the user to the event object information; and giving a reward to the user if the event is executed in the first scene or if the event is executed in the second scene.

A fifteenth embodiment is an information processing method executing: controlling, based on an operation by a user, an action of a user object in one space among two or more virtual spaces or one area among two or more areas within a virtual space; executing, in first scene where an event object and the user object are arranged in a predetermined positional relationship in any one of the virtual spaces or the areas, an event related to the event object; presenting to the user, in a second scene different from the first scene, event object information related to a plurality of event objects respectively arranged in the two or more virtual spaces or in the two or more areas; executing the event related to the event object information in the second scene in response to an operation by the user to the event object information; and giving a reward to the user if the event is executed in the first scene or if the event is executed in the second scene.

According to each of the thirteenth to the fifteenth embodiments, it is also possible to improve usability.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
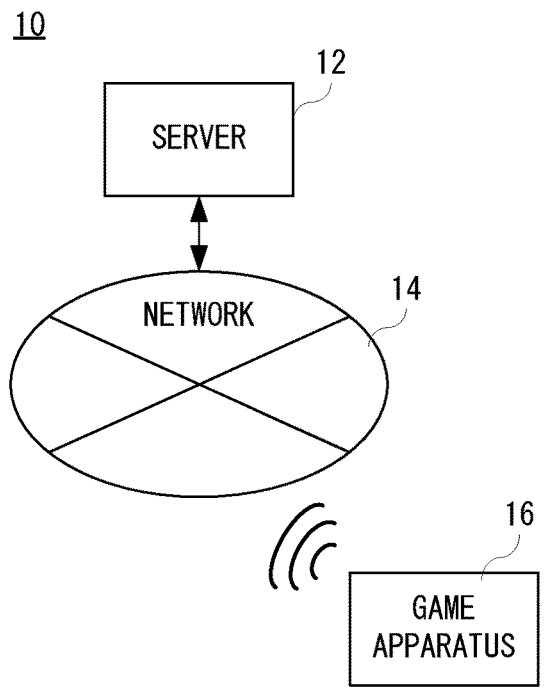
FIG. 1 is an illustration view showing a non-limiting example information processing system.

With reference to FIG. 1, a non-limiting example information processing system 10 includes a server 12, and the server 12 is communicably connected with a game apparatus 16 via a network 14 such as Internet.

Figure 10:
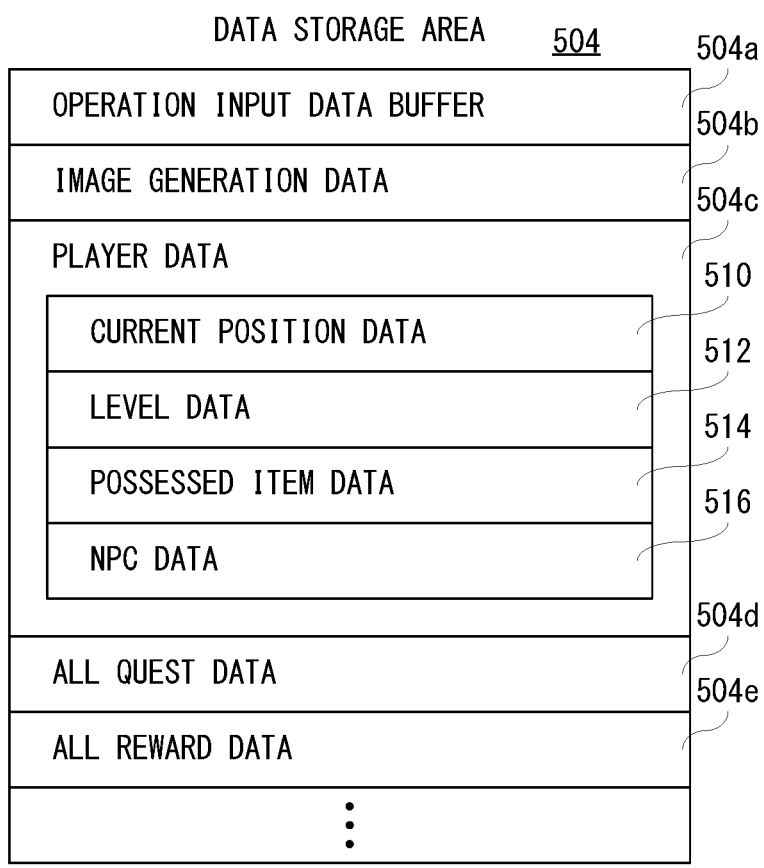
FIG. 10 is an illustration view showing non-limiting example contents of a data storage area of the RAM shown in FIG. 9.

The server (information processing server) 12 is a general-purpose server, and comprises circuit components such as a CPU, a memory (HDD, ROM, RAM, etc.), a communication module, etc. The server 12 stores (manages) game data (player data 504c shown in FIG. 10) of a virtual game that is played in the game apparatus 16 of this embodiment in an internal memory or a data base connected to an outside in association with information of the game apparatus 16 (or a user or player).

The game apparatus 16 is an example of an information processing apparatus, and may be not only a game dedicated apparatus but various kinds of electronic devices having a game function. The electronic devices may be a smartphone, a portable telephone (or feature phone), a tablet PC, a notebook PC, etc., for example. However, there is no necessity of being limited to a portable electronic device, and a stationary electronic device such as a game apparatus, an arcade game apparatus, a desktop PC, etc. can be used.

Figure 2:
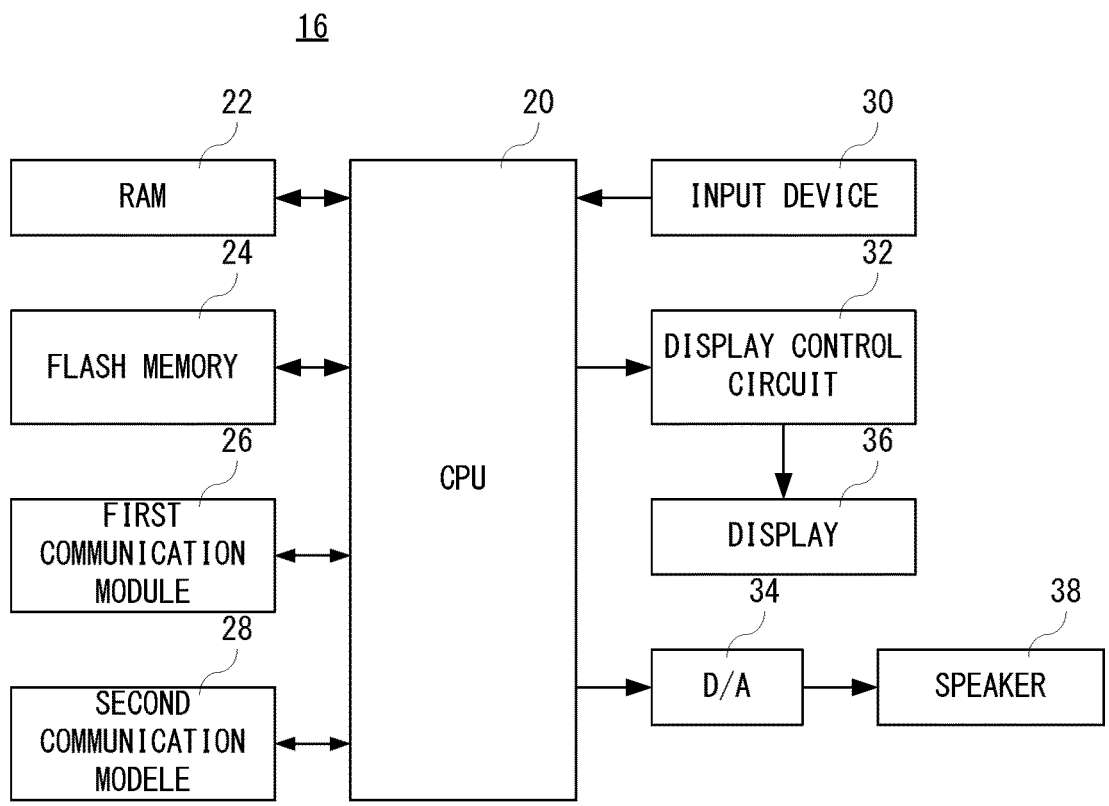
FIG. 2 is a block diagram showing non-limiting example electric structure of a non-limiting example game apparatus shown in FIG. 1.

FIG. 2 is a block diagram showing non-limiting example electric structure of the game apparatus 16 shown in FIG. 1. As shown in FIG. 2, the game apparatus 16 includes a CPU 20, and the CPU 20 is connected with a RAM 22, a flash memory 24, a first communication module 26, a second communication module 28, an input device 30, a display control circuit 32 and a D/A converter 34. Moreover, a display 36 is connected to the display control circuit 32, and a speaker 38 is connected to the D/A converter 34.

The CPU 20 is in charge of overall control of the game apparatus 16. The RAM 22 is a volatile storage medium and used as a working memory and a buffer memory for the CPU 20. The flash memory 24 is a nonvolatile storage medium, and used in order to store application program such as a game, and store (save) various kinds of data.

However, there is no necessity that an application is limited to a game application, and it is possible to perform various kinds of application such as a document production application, an email application, a painting application, character or letter practice application, a linguistic training application, a learning application, etc.

The first communication module 26 has a function to access a wireless LAN according to the standard of IEEE802.11.b/g, for example. Therefore, the CPU 20 transmits or receives data to or from further devices via an access point and Internet (network) with using the first communication module 26, for example. In this embodiment, the further device means the server 12 or/and another game, etc. The same applies hereinafter. However, it is also possible to transmit or receive data to or from other device directly with using the first communication module 26.

The second communication module 28 has a function to perform a short-distance wireless communication. Specifically, the second communication module 28 has a function to transmit or receive an infrared signal to or from other devices (here, other game apparatuses etc.) with a predetermined communication system (infrared ray system, for example), and a function to perform wireless communication with the same or similar kind of game apparatus according to a predetermined communication protocol (multilink protocol, for example). Therefore, the CPU 20 can transmit or receive data to or from the same or similar kind of other game apparatuses directly with using the second communication module 28, for example. However, instead of the short-distance wireless communication of an infrared ray system, short-distance wireless communication according to other wireless communication standards such as Bluetooth (registered trademark) may be performed.

The input device 30 includes various kinds of push buttons or switches that are provided on the game apparatus 16, for example, and is used by a user or player (hereinafter, simply referred to as "player") for various kinds of operations such as menu selection and a game operation. However, as the input device 30, instead of the push buttons or switches, or together with the push buttons or switches, an input portion such as a pointing device (a touch panel etc., for example), a microphone, a camera, etc. may be provided. Moreover, the touch panel may be built into a display 36 to be described later. The display 36 in this case is a touch panel integrated type display.

The display control circuit 32 includes a GPU, a VRAM, etc., and the GPU generates, using image generation data 504b (see FIG. 10) stored in the RAM and under instructions by the CPU 20, image data for displaying various kinds of screens on the display 36 is used in order to display various kinds of images in the VRAM, and the generated image data is output to the display 36.

The D/A converter 34 converts sound data applied from the CPU 20 into an analog game sound so as to output to the speaker 38. In addition, the game sound means a sound required for the game, such as a sound of a game character or object, sound effect and music (BGM).

In addition, the electric structure of the game apparatus 16 shown in FIG. 1 is a mere example, and it does not need to be limited to this. For example, the second communication module 28 may be dispensed with.

Figure 3:
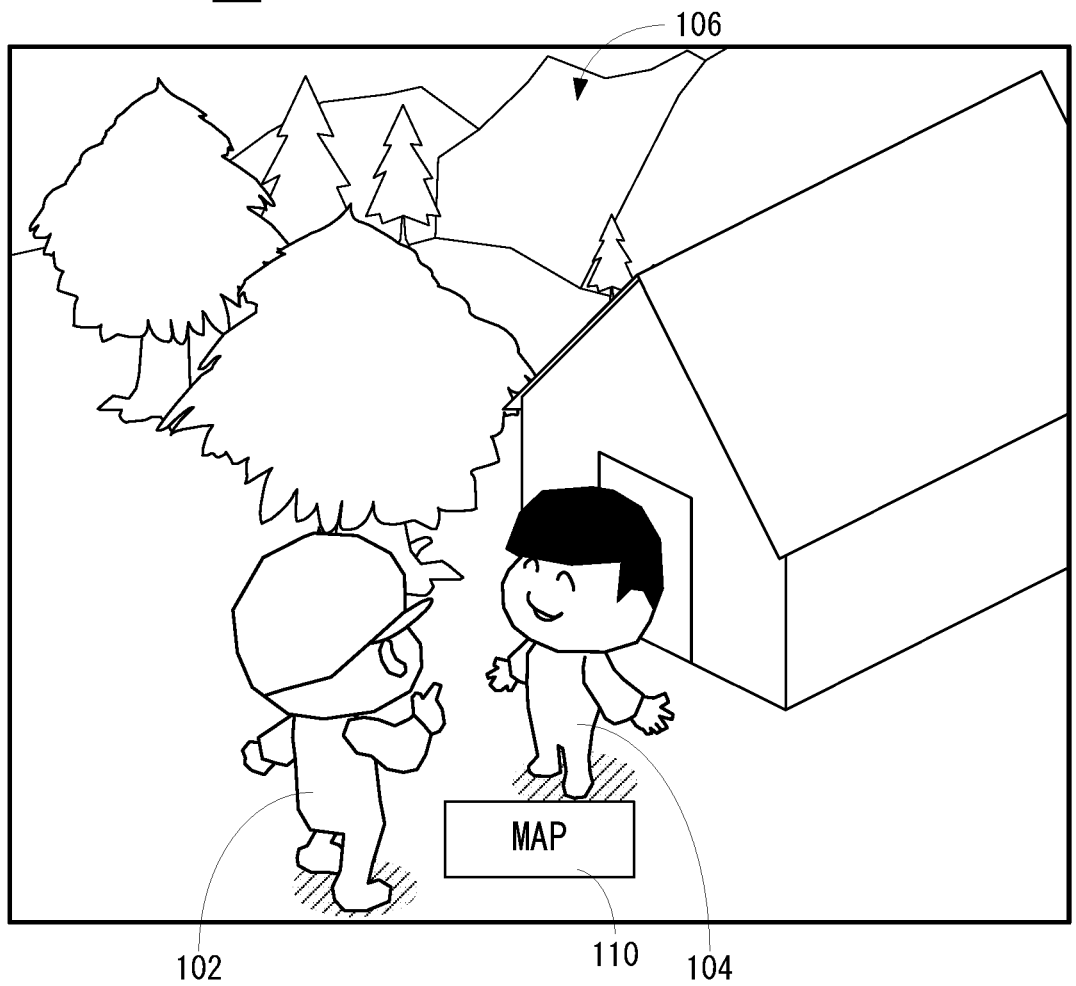
FIG. 3 is an illustration view showing a non-limiting example game screen displayed on a display shown in FIG. 2.

FIG. 3 is an illustration view showing a non-limiting example game screen 100 displayed on the display 36 when an application of a virtual game that is played with the game apparatus 16 shown in FIG. 1 is executed. As shown in FIG. 3, the game screen 100 includes a player character (hereinafter, referred to as "PC") 102 and a non-player character (hereinafter, referred to as "NPC") 104, and further includes a plurality of background objects 106.

The PC 102 is an object or character (corresponding to a "user object") whose action or motion is controlled by a player. In this embodiment, the PC 102 is a character imitating a human being. The action or motion of the PC 102 corresponds to moving, acquiring an item, delivering an item to the NPC 104, talking with the NPC 104, attacking an enemy character, defending an attack of an enemy character, etc., in a certain virtual place, i.e., in a virtual space.

However, in this embodiment, the moving means walking, running, sliding, going up, going down, getting on, getting off or jumping. In this embodiment, the items are not only tools used by the PC 102 or the NPC (104, etc.), but also various objects used or possessed by the PC 102 or the NPC (104, etc.) such as vegetables, flowers, tree nuts (or fruits), seeds of flowers and vegetable, insects, fishes, shells, treasure and money.

Moreover, a plurality of NPCs including the NPC 104 are objects or characters whose actions or motions are respectively controlled by a computer (the CPU 20 in FIG. 2) rather than by the player. In this embodiment, the NPC is a character imitating a human being as similar to the PC 102. The action or motion of the NPC corresponds to moving, acquiring an item, attacking the PC 102, defending an attack of the PC 102, etc.

The background object 106 is a terrain object arranged in the virtual space. In this embodiment, the terrain means the ground (including roads, flower fields, farmlands, etc.), mountain, river, sea, slopes, floors, trees, grass, flowers, buildings, stairs, caves, cliffs, walls (steps), etc.

The game apparatus 16 functions also as an image processing apparatus, and generates and outputs (displays) image data corresponding to various screens such as the game screen 100. In brief, the GPU incorporated in the display control circuit 32 performs modeling of various kinds of objects or characters in a three-dimensional virtual space under instructions of the CPU 20. That is, various kinds of objects or characters are created or arranged in the virtual space, whereby a certain sight or scene can be generated. An image that this sight is imaged by a virtual camera (viewed from the viewpoint) is displayed on the display 36. Describing specific image processing, a certain sight is first generated in the three-dimensional (or a world coordinates system) virtual space, and then, the sight generated in the virtual space is converted into a coordinates system viewed by the virtual camera (i.e., camera coordinates system). For example, an image viewed from a viewpoint is perspective-projected on a virtual screen. Next, clipping and hidden surface removal processing are performed. Subsequently, brightness (shade) on an object surface is expressed by performing shading. Furthermore, shadows caused by the object are expressed by performing shadowing (that is, shadow attachment). Then, texture mapping is performed. A two-dimensional image of the scene generated in the three-dimensional virtual space is thus generated (drawn), and two-dimensional image data corresponding to the generated two-dimensional image is output to the display 36. Although the three-dimensional image viewing the virtual space from the viewpoint is converted into the two-dimensional image so as to display various screens on the display 36 in this embodiment, as mentioned later, in order to distinguish from a case generating (drawing) a two-dimensional game image in the virtual space, an image that an object or character looks in three-dimensions like the game screen 100 is referred to as a "three-dimensional game image".

In addition, in generating the three-dimensional image, instead of performing shadowing, a shadow texture having a simple shape (for example, a circle, an ellipse, a triangle or a rectangle) may be pasted.

In the virtual game of this embodiment, a plurality of places (virtual spaces) are provided, and in each of the places, the player can make the PC 102 act to acquire an item. Moreover, by using the acquired item, the PC 102 can makes or purchases an appreciation object or furniture. A person who makes an appreciation object or furniture may be an NPC requested by the PC 102. Moreover, the PC 102 arranges the appreciation object or furniture having been made or purchased in a residence of the PC 102 or the like. Moreover, in the respective places, the player can increase an intimacy degree with an NPC by causing the PC 102 to act, to talk with the encountered NPC or to clear a quest issued by an NPC. The intimacy degree is set with a numeral value more than 0 (zero) for each NPC. When the PC 102 has never encountered (that is, never met) an NPC, the intimacy degree with the NPC is 0 (zero), and if the PC 102 meets once with an NPC to have a conversation or if the PC 102 clear a quest issued by an NPC, the intimacy degree of the PC 102 with the NPC is increase to 1 (one). Thereafter, when clearing a quest issued by an NPC by the number that is set in each intimacy degree, the intimacy degree with the NPC is increased by one level.

In addition, although this embodiment will be described in a case where a plurality of places are a plurality of virtual spaces different from each other, a plurality of places may be a plurality of areas different from each other within one virtual space.

If a distance between the PC 102 and an NPC becomes less than a predetermined distance, it is determined that the PC 102 encounters the NPC, and the PC 102 may have a conversation with the encountered NPC or may be issued a quest from the encountered NPC. As an example, the predetermined distance is the length corresponding to 1 (one) meter in the virtual space. However, this is an example, and when the PC 102 approaches the NPC, the player may cause the PC 102 to encounter the NPC by performing some operation. Moreover, instead of the PC 102 encountering an NPC, when the player designates (touches or taps) a desired NPC near the PC 102, the PC 102 may have a conversation with the NPC or may be issued a quest by the encountered NPC.

In this embodiment, issuing a quest from the NPC to the PC 102 is an example of occurrence of an event, and in this case, clearing the quest by the PC 102 is execution of the event. Moreover, an NPC having a quest is an object or character (corresponding to an "event object") that issues an event.

Here, a quest issued by the NPC is a request to the PC 102, and corresponds to requiring the PC 102 to delivery an item desired by the NPC, requiring the PC 102 to answer to a question of the NPC, etc.

However, an item desired by the NPC can be acquired in each place (each virtual place), and corresponds to vegetables, flowers, tree nuts (or fruits), insects, fishes, shells, treasure, etc, for example. However, an item desired by the NPC does not need to be limited to these items.

Moreover, the player can answer to a question of the NPC by selecting a choice from choices prepared in advance, and for example, choosing a hairstyle or clothe that matches the NPC from choices, choosing a professional baseball team being favorite to the NPC from choices, choosing an answer to troubles of the NPC from choices, and so on.

In this embodiment, a scene where a distance between the PC 102 and the NPC becomes less than a predetermined distance in the virtual space is corresponding to a "first scene where an event object and a user object are arranged in the virtual space with a predetermined positional relationship".

Figure 4:
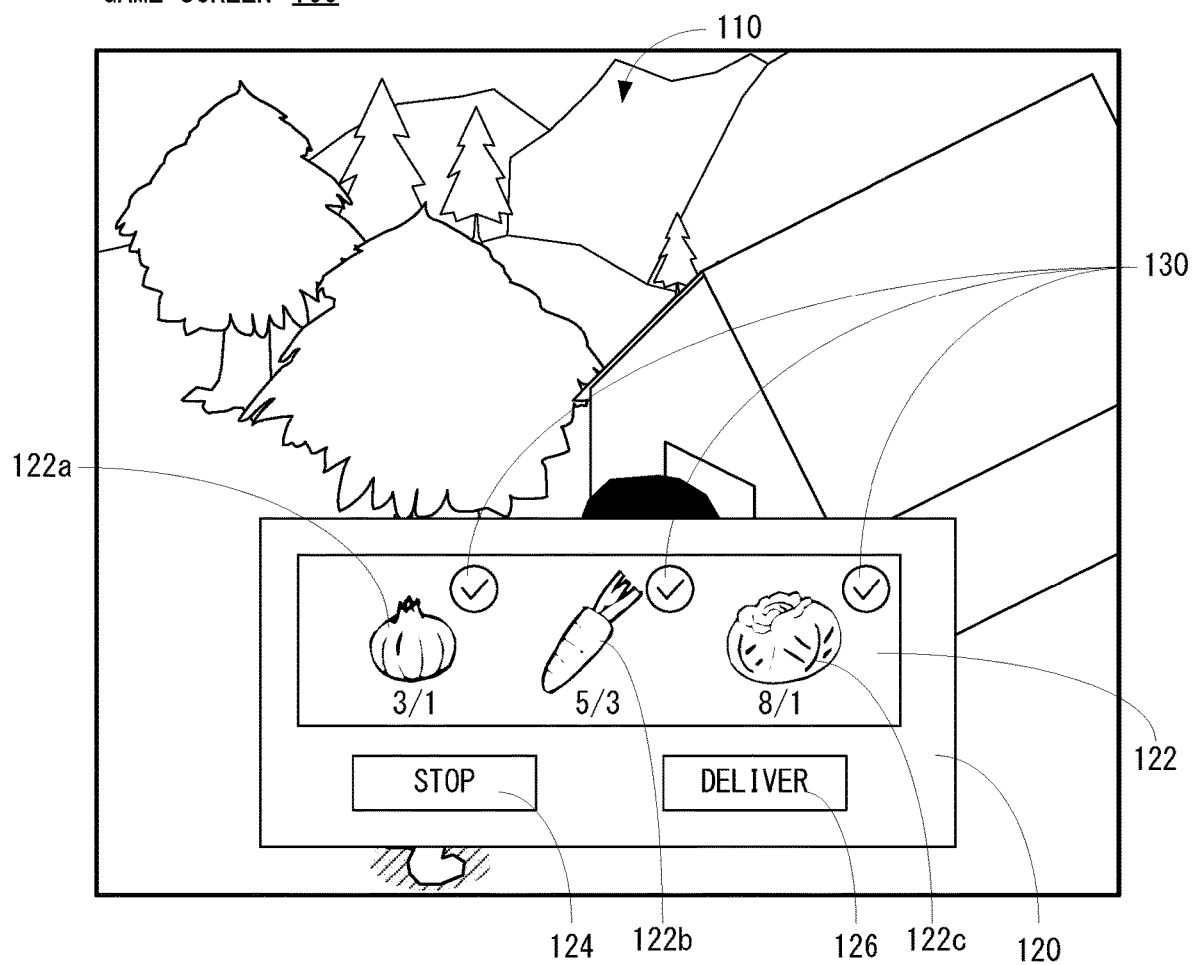
FIG. 4 is an illustration view showing another non-limiting example game screen displayed on the display shown in FIG. 2.

FIG. 4 is an illustration view showing a non-limiting example game screen 100 when the PC 102 encounters the NPC 104 and a quest is issued from the NPC 104.

In the game screen 100 shown in FIG. 4, an image of an item desired by the NPC 104, the desired number, etc. (hereinafter, "desired item image") is displayed. The desired item image 120 is a dialog box formed with a display area 122 that displays items desired by the NPC 104, the desired number, etc., and is provided with icons 124 and 126 below the display area 122.

In the display area 122, images of the items desired by the NPC 104 and the desired number of each of the items (hereinafter, referred to as "desired number") are displayed. However, in this embodiment, the number possessed by the PC 102 (hereinafter, referred to as "possession number") of the items desired by the NPC 104 is also displayed. In this embodiment, the possession number is displayed below the image of the item and at the left of a slash mark and the desired number is displayed at the right of the slash mark.

In an example shown in FIG. 4, one onion, three carrots and one cabbage are desired, and the PC 102 possesses three onions, five carrots and eight cabbages. Moreover, when the PC 102 can deliver the item desired by the NPC 104 to the NPC 104 (that is, when a condition is satisfied), an image indicating that the item can be delivered to the NPC 104 (hereinafter, referred to as "satisfaction image") 130 is displayed on the right of the image of the item desired by the NPC 104. However, when the PC 102 cannot deliver the item desired by the NPC 104 to the NPC 104 (that is, a condition cannot be satisfied), a side of the image of the item not capable of being delivered is made blank. That is, the satisfaction image 130 is not displayed.

An icon 124 is provided in order to return to the game screen 100 shown in FIG. 3 when stopping to deliver the item desired by the NPC 104 to the NPC 104, that is, when choosing not to clear a presented quest. That is, if the icon 124 is turned on, the desired item image 120 is closed (or undisplayed).

An icon 126 is provided in order to return to the game screen 100 shown in FIG. 3 when delivering the item(s) desired by the NPC 104 to the NPC 104 by the desired number. In this case, the item(s) delivered to the NPC 104 is deleted or subtracted from the items possessed by the PC 102 (hereinafter, referred to as "possession item") by the number delivered. If the PC 102 delivers the item(s) desired by the NPC 104 to the NPC 104 by the desired number, the request of the NPC 104 is satisfied. That is, the quest issued by the NPC 104 is cleared.

Such the desired item image 120 is a two-dimensional game image generated in the virtual space, and generated by composing images of respective items 122a, 122b and 122c, the icon 124, the icon 126, the satisfaction image 130 and images of symbols (the above-mentioned desired number, possession number and the slash mark) with a two-dimensional background image. However, the images of respective items 122a, 122b and 122c, images of the icons 124 and 126, the satisfaction image 130 and the images of symbols are two-dimensional images. These two-dimensional images may be generated in advance, or may be generated when generating the desired item image 120. Thus, when generating the two-dimensional game image, only two-dimensional images such as the images of the items 122a, 122b and 122c are composed, and therefore, a processing load is smaller than that of generation processing of a three-dimensional game image. Moreover, the two-dimensional game image such as the desired item image 120 is an image for a scene different from the three-dimensional game image such as the game screen 100, and is generated in a two-dimensional or three-dimensional virtual space different from the three-dimensional game image. However, the two-dimensional game image such as the desired item image 120 may be generated in another area of the same virtual space as that of a case where the three-dimensional game image such as the game screen 100 is generated. In the following, the same or similar processing is executed when a two-dimensional game image is to be generated.

In the example of the game screen 100 shown in FIG. 4, since the PC 102 possesses all the items desired by the NPC 104 more than the desired number, it is in a state where the icon 126 can be operated. That is, the PC 102 is in a state where a quest issued by the NPC 104 can be cleared. In other words, the PC 102 is in a state where an event related to the NPC 104 that is an event object can be executed. Therefore, the game screen 100 as shown in FIG. 4 can be referred to as a screen in a manner capable of clearing a quest.

Although illustration is omitted, if the PC 102 does not possess the item desired by the NPC 104, or if the possession number is lacks even if the PC 102 possesses the desired item(s), the icon 126 is in an inoperable state. That is, the PC 102 is in a state where a quest issued by the NPC 104 cannot be cleared. In other words, the PC 102 is in a state where an event related to the NPC 104 cannot be executed. In this case, the icon 126 is displayed by grayout, for example, and even if the icon 126 is operated, it is impossible to deliver the item that the PC 102 possesses to the NPC 104. That is, it is impossible to clear the quest issued by the NPC 104. Therefore, the game screen 100 that the icon 126 is displayed by grayout can be referred to as a screen of a manner that a quest cannot be cleared.

Moreover, if the PC 102 clears a quest issued by the NPC, that is, if the PC 102 executes an event, the PC 102 can be given a reward from NPC. That is, a reward is given to the PC 102 or player. In this embodiment, the reward is an item that the PC 102 uses in the virtual game.

Figure 5:
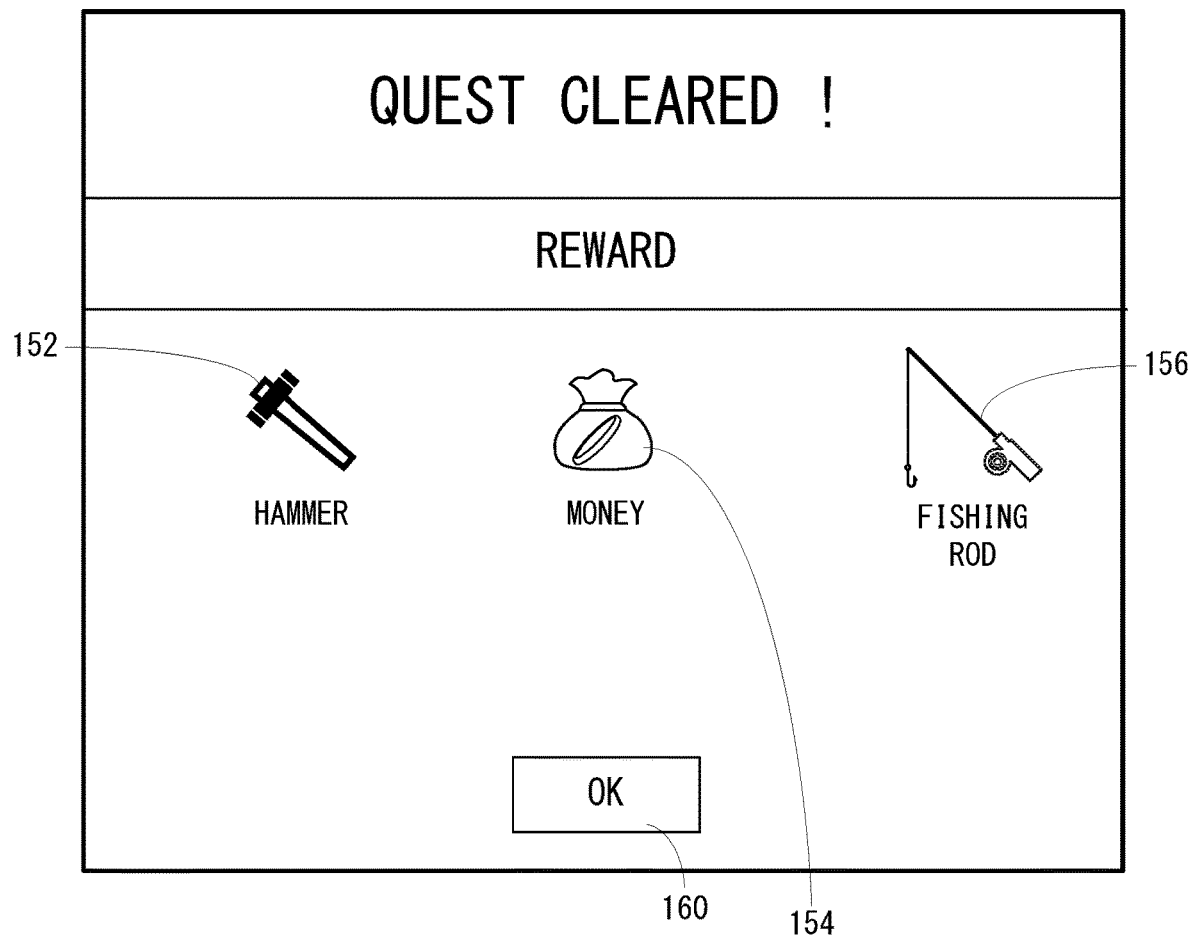
FIG. 5 is an illustration view showing a non-limiting example reward confirmation screen displayed on the display shown in FIG. 2.

For example, in the game screen 100 shown in FIG. 4, when the player operates the icon 126, as mentioned above, the items 122a, 122b and 122c are delivered to the NPC 104 by the desired numbers. That is, the quest issued by the NPC 104 is cleared. Then, a predetermined reward is given, and a reward confirmation screen 150 shown in FIG. 5 is displayed on the display 36. For example, the reward confirmation screen 150 is a dialog of a two-dimensional game image, and is displayed on the front of the game screen 100. This reward confirmation screen 150 is a screen for confirming by the player a given reward.

As shown in FIG. 5, in the reward confirmation screen 150, a character string indicating that the quest has been cleared is displayed in an upper part, and images 152, 154 and 156 of reward items are displayed below the character string. Furthermore, an icon 160 is provided below the images 152-156 of the items.

For example, the quest to be issued from the NPC is prepared in a plural number in advance, and a reward to given when each of the quest is cleared is also determined in advance. Moreover, if the quest issued by the NPC is cleared by the PC 102, this quest is deleted and another different quest is assigned to this NPC. This is to prevent the same quest from being issued repeatedly to the PC 102 from the NPC. Moreover, in this embodiment, a new quest is assigned to the NPC at every predetermined time (for example, 3 hours, in real time).

As mentioned above, in order to assign a quest different from the cleared quest to the NPC, in this embodiment, a history of cleared quests is recorded for each NPC.

Therefore, when assigning a quest to the NPC, a quest that is not recorded in the history is selected. However, what is recorded in the history is identification information of the quest cleared by the PC 102. Therefore, if a quest being had by the NPC has not been cleared when assigning a new quest, the quest not having been cleared is replaced with a new quest to be assigned at this time, but the identification information on the quest not having been cleared is not recorded in the history.

In addition, a method of assigning a quest to the NPC is a mere example, and should not be limited. Even if the quest not having been cleared is replaced with a new quest, the identification information on the quest not having been cleared may be recorded in the history. Moreover, the same quest as the cleared quest may be assigned to the same NPC.

When the quest shown in FIG. 4 is cleared, the reward confirmation screen 150 as shown in FIG. 5 is displayed on the display 36. At this time, the items of a hammer, money and a fishing rod are given to the PC 102 or player as a reward. The given item is added to the possession item of the PC 102. Although a case where each item is given one by one is shown in the example shown in FIG. 5, a plurality of items may be given. In that case, two or more same items are displayed in the reward confirmation screen 150, or a numerical value indicative of the number is shown near the item.

Moreover, the icon 160 is provided in order to indicate that the PC 102 or player has confirmed the contents of the given reward, and when this icon 160 is operated, the reward confirmation screen 150 is closed and the game screen 100 is displayed on the display 36. That is, a screen returns to the game screen 100.

Moreover, as mentioned above, a plurality of places are provided in the virtual game, and it is possible to move the PC 102 to a selected place when the player selects a desired place on a map.

Figure 6:
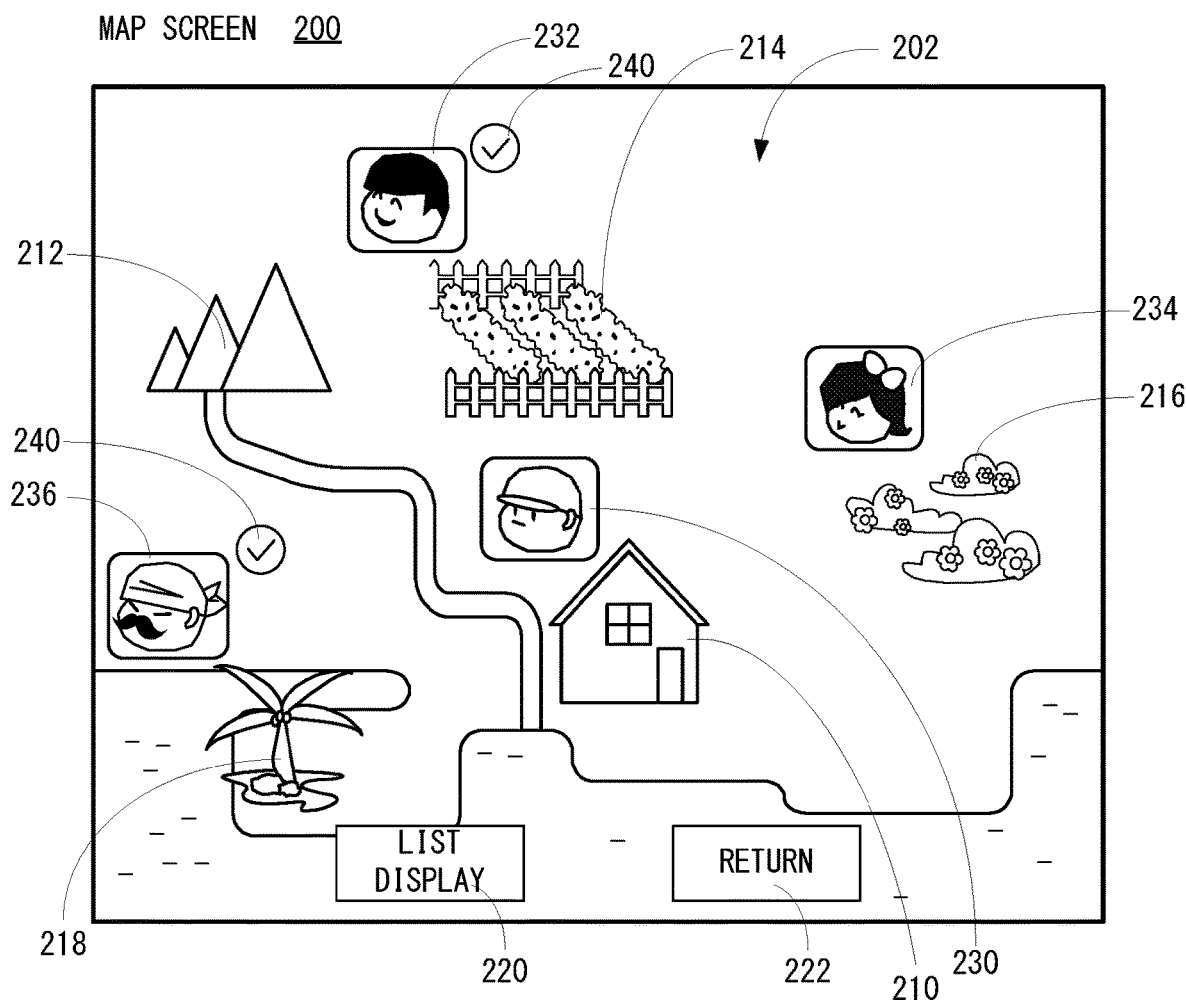
FIG. 6 is an illustration view showing a non-limiting example map screen displayed on the display shown in FIG. 2.

FIG. 6 is an illustration view showing a non-limiting example map screen 200. In the game screen 100 shown in FIG. 3, by operating the icon 110, the map screen 200 is displayed on the display 36 instead of the game screen 100. This map screen 200 is a two-dimensional game image, and includes a map image 202. The ground, a river and the sea are provided in the map image 202 as the background objects, and icons 210, 212, 214, 216 and 218 corresponding to respective places are provided on the front of the background objects. Moreover, in the map screen 200, icons 220 and 222 are provided in a lower part and on the front of the map image 202.

Moreover, images (in this embodiment, face images) 230, 232, 234 and 236 of the PC 102 or the NPC(s) (104, etc.) are displayed in the upper left of the icons 210, 214, 216 and 218. Furthermore, a satisfaction image 240 is displayed in the upper right of each of the face image 232 and the face image 236.

The icon 210 is provided in order to move the PC 102 to a first place (for example, village) where a residence of the PC 102 exists. The icon 212 is provided in order to move the PC 102 to a second place where a mountain and a river exist. The icon 214 is provided in order to move the PC 102 to a third place where farmland exists. The icon 216 is provided in order to move the PC 102 to a fourth place where a flower field exists. The icon 218 is provided in order to move the PC 102 to a fifth place where a beach exists.

In this embodiment, each of the images of the icons 210-218 is an image showing a corresponding place or the feature of the place. The image of the icon 210 is an image of a house, the image of the icon 212 is an image of a mountain, the image of the icon 214 is an image of a crop field, the image of the icon 216 is an image of a flower field and the image of the icon 218 is an image of a palm tree.

Figure 8:
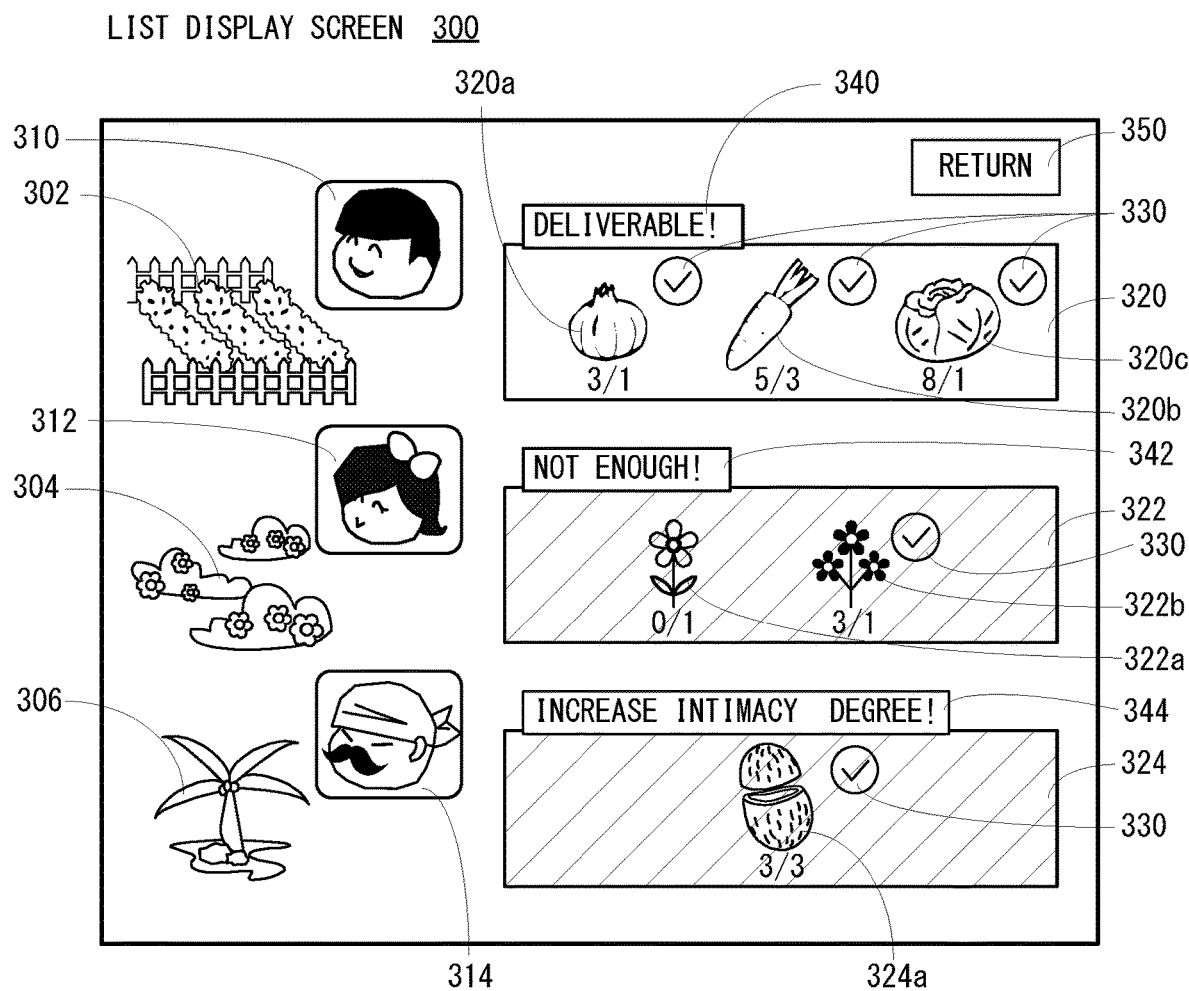
FIG. 8 is an illustration view showing a non-limiting example list display screen displayed on the display shown in FIG. 2.

The icon 220 is provided in order to display a list display screen 300 (see FIG. 8). Although detailed description is mentioned later, the list display screen 300 is a screen for displaying quests issued by the NPCs existing in respective places by list, and for clearing the quests displayed by list by an operation of the player. Since the NPC having a quest is equal to an "event object" as mentioned above, the list display screen 300 can be referred to as a screen displaying information about event objects (corresponding to "event object information") by list. Moreover, the icon 222 is provided in order to close the map screen 200 to return to the game screen 100.

The face images 230, 232, 234 and 236 indicate the PC 102 or the NPC(s) (104, etc.) each existing in each place corresponding to each of the icons 210-218. However, in this embodiment, in the map screen 200, the NPCs whose face images (232-236) are displayed are NPCs capable of issuing a quest to the PC 102. By displaying the face images 230-236, it can be seen that the PC 102 exists in the first place corresponding to the icon 210, the NPC 104 exists in the third place corresponding to the icon 214, another NPC exists in the fourth place corresponding to the icon 216, and a further NPC exists in the fifth place corresponding to the icon 218. That is, by displaying the map screen 200 on the display 36, it is possible to present a place where an NPC having a quest exists.

Moreover, the satisfaction image 240 indicates that the PC 102 can clear a quest issued by each of the NPCs (in FIG. 6, the NPC 104 and the further NPC) corresponding to each of the face images (in FIG. 6, the face image 232 and the face image 236) displayed near the satisfaction image 240. Therefore, when the player wants to obtain a reward, the player moves the PC 102 to a place where the NPC exists that the satisfaction image 240 is displayed nearby.

Figure 7:
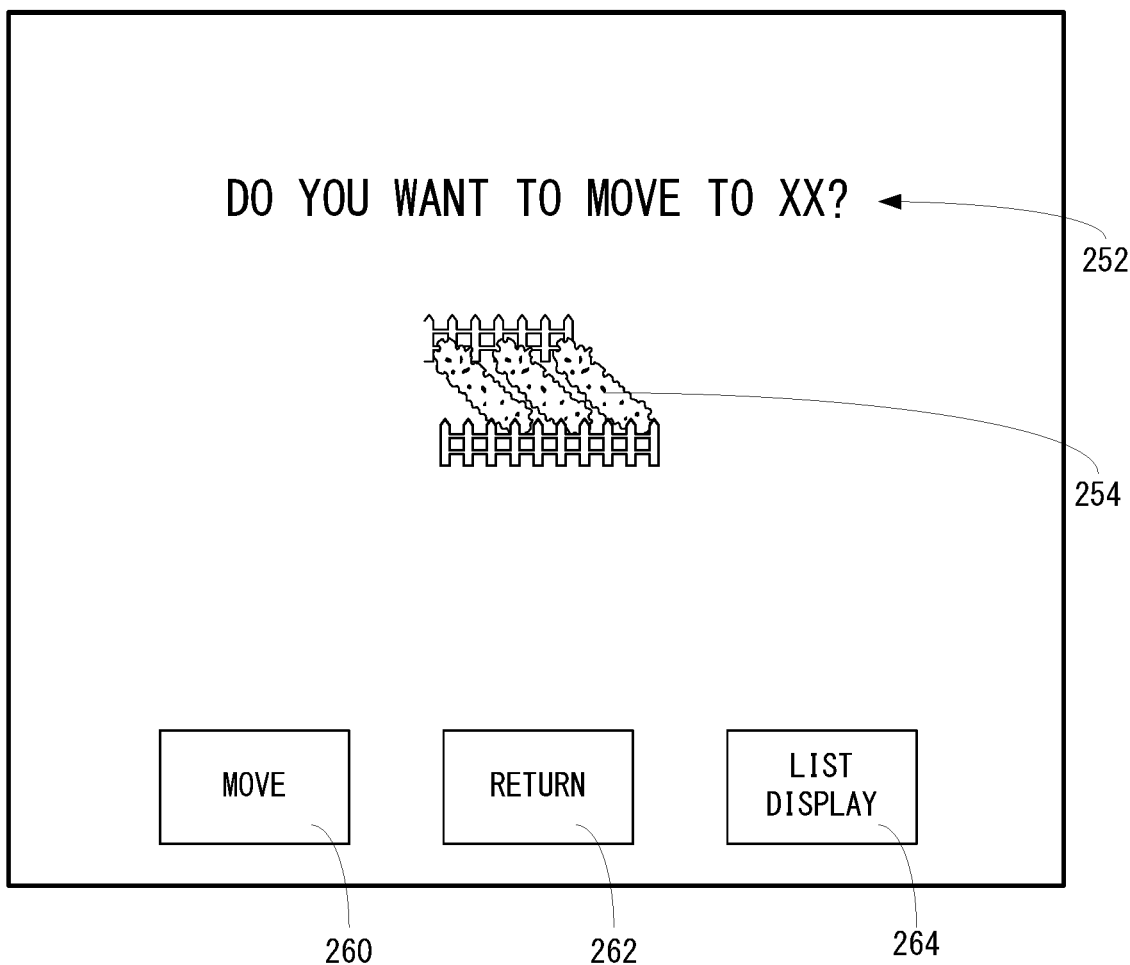
FIG. 7 is an illustration view showing a non-limiting example movement selection screen displayed on the display shown in FIG. 2.

In the map screen 200 shown in FIG. 6, if an icon (in FIG. 6, 212, 214, 216 or 218) is operated in order to make the PC 102 move from a certain place (in FIG. 6, the first place) to somewhere else (in FIG. 6, any of the second-fifth places), a movement selection screen 250 as shown in FIG. 7 is displayed on the front of the map screen 200.

The movement selection screen 250 is a screen for selecting whether the PC 102 is to be moved to a place corresponding to the icon operated by the player, i.e., a movement destination. A text 252 for confirming whether a movement to the movement destination (here, "xx" is indicated as a name of the place of the movement destination) is to be performed, and an image 254 indicating a place of the movement destination are displayed in the upper part of this movement selection screen 250. Moreover, the movement selection screen 250 is provided with icons 260, 262 and 264 below the image 254. The icon 260 is provided in order to select or execute moving the PC 102 to the movement destination. The icon 262 is provided in order to select or execute returning to the map screen 200 without selecting to move the PC 102 to the movement destination. The icon 264 is provided in order to select or execute displaying the list display screen 300.

In addition, an image (in FIG. 7, the image 254) indicating the place displayed in the movement selection screen 250 is the same image as the image of each of the icons 210-218 corresponding to the places provided in the map screen 200.

Although detailed description is omitted, if the icon 260 is operated, a movement to the place corresponding to the icon 210, 212, 214, 216 or 218 that is operated in the map screen 200 is executed, and the three-dimensional game image about that place is generated. At this time, the PC 102 is arranged in the place. Moreover, in generating the three-dimensional game image, an NPC existing in the place is also arranged. Therefore, the game screen 100 as shown in FIG. 3 is displayed on the display 36. However, the background objects arranged in the virtual space where the place after movement is provided differ in all or in part for each place. Moreover, existing NPC(s) differ place by place. Furthermore, a predetermined item is arranged as needed.

Thus, the PC 102 is moved to the place where the NPC having a quest exists, whereby the quest issued by the NPC can be cleared. However, in this embodiment, it is possible to make the PC 102 clear the quests issued by the NPCs without moving the PC 102 to respective places by displaying the quests being had by one or more NPCs by list.

FIG. 8 is an illustration view showing a non-limiting example list display screen 300 displayed on the display 36. As mentioned above, when the icon 220 is operated in the map screen 200, or when the icon 264 is operated in the movement selection screen 250, the list display screen 300 is displayed on the display 36. The list display screen 300 is a two-dimensional game image, and is displayed on the front of the map screen 200. As mentioned above, the list display screen 300 is a screen for displaying by list the quests issued by NPCs existing respective places, and for clearing the quests displayed by list by an operation of the player. However, when there is no NPC having a quest in any places, no quest is displayed in the list display screen 300.

As shown in FIG. 8, images 302, 304 and 306 indicative of places are displayed in a left end portion vertically in line in the list display screen 300. A face image 310 of the NPC 104 and an icon 320 are displayed on the right of the image 302. A face image 312 of another NPC and an icon 322 are displayed on the right of the image 304. A face image 314 of a further NPC and an icon 324 are displayed on the right of the image 306. Moreover, a display area 340 is formed at the upper left of the icon 320, a display area 342 is formed at the upper left of the icon 322, and a display area 344 is formed at the upper left of the icon 324. Furthermore, an icon 350 is provided in the upper right of the list display screen 300.

The images 302, 304 and 306 are images indicating the places where the NPCs (104, etc.) each having a quest exist, and the same images as the images of the icons 214, 216 and 218 displayed in the map screen 200 are used. It is also the same as when an image indicating another place is displayed. The face images 310, 312 and 314 are face images of the NPC(s) (104, etc.) each having a quest, and are the same images as the face images 232, 234 and 236 displayed in the map screen 200. The icons 320, 322 and 324 are provided in order to clear the quest issued from the NPC(s) (104, etc.). An image of an item desired by each of the NPC(s) (104, etc.) whose face images 310, 312 and 314 are displayed corresponding to the icons 320, 322 and 324 is displayed on each of the icons 320, 322 and 324. The images 320a, 320b and 320c are displayed in the icon 320, and the possession number, a slash mark and the desired number are respectively displayed below the images 320a-320c. The images 322a and 322b are displayed in the icon 322, and the possession number, a slash mark and the desired number are respectively displayed below the images 322a and 322b. The image 324a is displayed in the icon 322, and the possession number, a slash mark and the desired number are respectively displayed below the images 324a.

Furthermore, when the possession number is equal to or more than the desired number for each item, the satisfaction image 330 is displayed for the right of the image of that item. Therefore, in the icon 320, the satisfaction image 330 is displayed on the right of each of the images 320a-320c. Moreover, in the icon 322, the satisfaction image 330 is displayed on the right of the image 322b. Moreover, in the icon 324, the satisfaction image 330 is displayed on the right of the image 324a.

In this embodiment, processing that the item(s) desired by the NPC(s) (104, etc.) whose face images 310, 312 and 314 are displayed corresponding to the icons 320, 322, and 324 are delivered from the PC 102 to the NPC(s) is executed by operating the icons 320, 322 and 324. That is, a quest is cleared.

Moreover, as mentioned above, the images 302, 304 and 306 indicating the places and the face images 310, 312 and 314 are displayed in the list display screen 300, and the item images 320a-320c, 322a, 322b and 324a are displayed in the icons 320, 322 and 324, and therefore, information on a quest that each of one or more NPCs existing in one or more places has is presented in the list display screen 300.

Since the PC 102 can deliver all items desired by the NPC 104 of the face image 310 by the desired number, the icon 320 is displayed in a state that can be operated (hereinafter, this display manner or display method may be referred to as "normal"). Therefore, in the display area 340, a text indicating that the quest can be cleared (in this case, "deliverable") is displayed.

Moreover, since the PC 102 does not possess the item of the image 322a among the items desired by the NPC of the face image 312, the PC 102 cannot clear the quest issued from the NPC. Therefore, the icon 322 is displayed in a state that cannot be operated. In this embodiment, the icon 322 is displayed by grayout. However, in the drawings, by applying an oblique hatching to the icon 322, it is expressed that the icon 322 is displayed by grayout and thus in a state that cannot be operated. The same is applied to the icon 324 mentioned later. Moreover, in the display area 342, as a reason why the quest cannot be cleared, a text indicating that the desired item is insufficient (here, "not enough!") is displayed.

Furthermore, although the PC 102 can deliver all items desired by the NPC of the face image 314 by the desired number, the icon 324 is displayed in a state that cannot be operated. That is, the icon 324 is displayed by grayout. This is because the quest in the list display screen 300 is allowed to be cleared when the intimacy degree is equal to or more than a predetermined value (for example, "1"), in this embodiment. As mentioned above, when the PC 102 has never met the NPC, the intimacy degree is 0 (zero), and if the PC 102 has met the NPC even once, the intimacy degree is equal to or more than 1 (one). That is, in this embodiment, the quest issued from the NPC that has never met is prohibited from clearing via the list display screen 300. In this case, the PC 102 needs to move, using the map screen 200, to the place where the NPC that has never met exists, and meet the NPC to clear a quest. Therefore, in the display area 344, as a reason why the quest cannot be cleared, a text indicating that has never met (here, "increase intimacy degree") is displayed.

Moreover, the icon 350 is provided in order to close the list display screen 300 and return to the map screen 200 as shown in FIG. 6.

If the icon 320 is operated in the list display screen 300, the quest issued from the NPC 104 is cleared as similar to a case where the icon 126 is operated in the game screen 100 shown in FIG. 4. Then, a reward is given to the PC 102 and the reward confirmation screen 150 as shown in FIG. 5 is displayed on the display 36. Here, if the icon 160 is operated, the reward confirmation screen 150 is closed to be returned to the list display screen 300.

In this embodiment, a scene where the two-dimensional game image for the list display screen 300 corresponds to a "second scene", and is also referred to as a "scene where the event object and the user object do not have a predetermined positional relationship" or a "scene where the user object does not exist in the virtual space".

As mentioned above, the player may clear the quest issued by the NPC by making the PC 102 encounter the NPC in the game screen 100 (hereinafter, simply referred to as "first method"), or may clear the quest issued by the NPC by displaying the list display screen 300 (hereinafter, simply referred to as "second method"). Although the PC 102 is moved to the places where the NPCs each having a quest exist sequentially and is made to clear a plurality of quests in the first method, in the second method, since quests are cleared in the list display screen 300, it is not necessary to move the PC 102 to the places where the NPCs each having a quest exist. Therefore, in case of the second method, the player can acquire the item that is given as a reward in a short time. That is, it is possible to improve usability of the player. Moreover, in the second method, when a plurality of quests are displayed in the list display screen 300, the plurality of quests can be cleared sequentially in the list display screen 300, and therefore, it is easier to clear a plurality of quests.

Moreover, as mentioned above, the game screen 100 is the three-dimensional game image, and when the three-dimensional game image is drawn, a processing load is larger than a case of drawing a two-dimensional game image. Therefore, in a case of the second method, in comparison with a case of making the PC 102 move to respective places so as to clear a plurality of quests by the first method, it is possible to greatly reduce a processing load. That is, depending on an operation of the player, a processing load can be reduced. Thus, since the power consumption of circuit components such as the CPU 20 can also be reduced largely in case of the second method, so that the battery consumption can also be suppressed as much as possible.

Moreover, in this embodiment, the quest cleared by the first method becomes a quest having already been cleared, and even if the list display screen 300 is displayed thereafter, the quest is not displayed in the list display screen 300. Moreover, the quest cleared by the second method also becomes a quest having already been cleared, and even if the PC 102 encounters the NPC having had the quest, the same quest is not issued. That is, clearing by the second method the quest having been cleared by the first method is restricted (or prohibited), and clearing by the first method the quest having been cleared by the second method is also restricted (or prohibited). However, when an NPC differs, even if it is the quest cleared once, the quest may be issued again.

Furthermore, in this embodiment, the reward to the quest prepared in the virtual game is determined in advance, and therefore, the reward that is given when the quest is cleared by causing the PC 102 to encounter the NPC in the game screen 100 and the reward that is given when the quest is cleared in the list display screen 300 are the same. However, in another embodiment, these rewards may not be the same. Alternatively, it is possible to obtain the reward in short time when clearing the quest in the list display screen 300, and therefore, the money possessed by the PC 102 may be subtracted by predetermined quantity whenever the quest is cleared.

Moreover, if the PC 102 clears the quest issued from the NPC, the NPC becomes a state not having a quest, and if a predetermined condition is satisfied, a next quest is assigned to the NPC. For example, the predetermined condition is that a predetermined time period (for example, 3 hours) elapses in real time, or that the PC 102 uses a predetermined item. At this time, as mentioned above, a quest different from the quest that the NPC issued in the past is assigned to the NPC.

Figure 9:
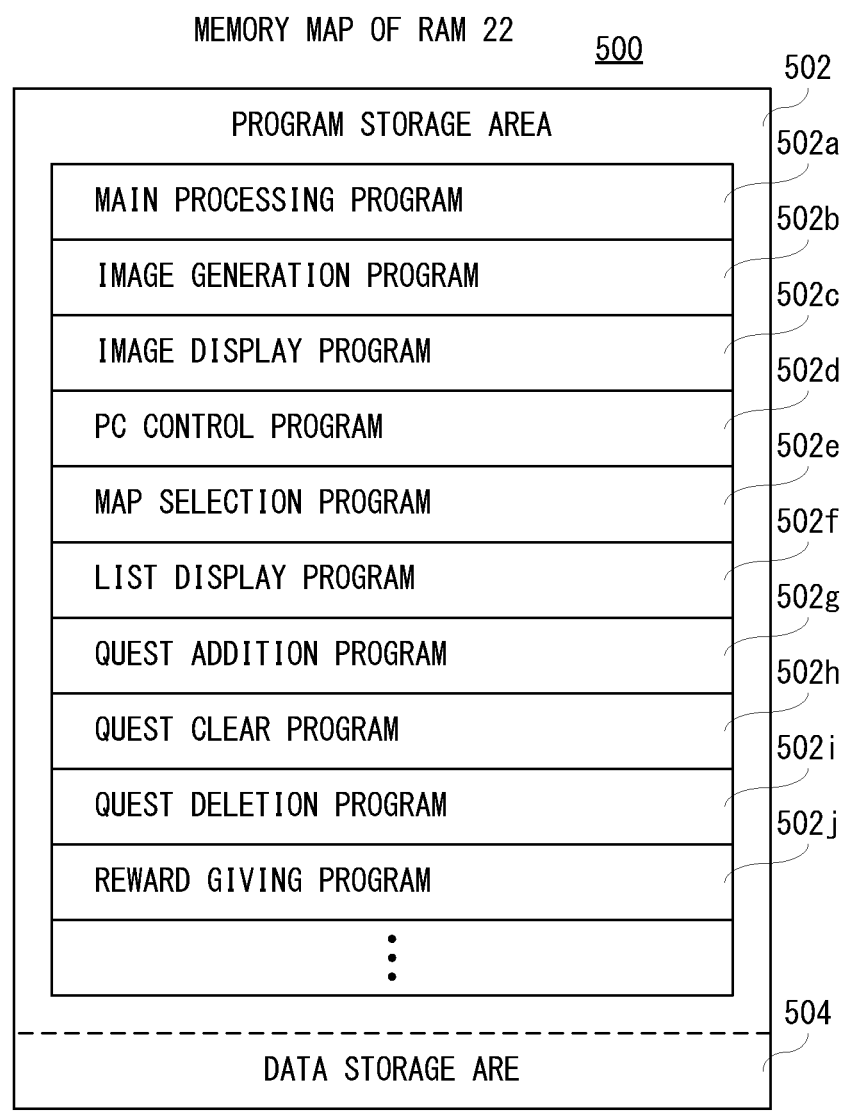
FIG. 9 is an illustration view showing a non-limiting example memory map of a RAM incorporated in the game apparatus shown in FIG. 2.

FIG. 9 is an illustration view showing a non-limiting example memory map 500 of the RAM 22 of the game apparatus 16 shown in FIG. 2. As shown in FIG. 9, the RAM 22 includes a program storage area 502 and a data storage area 504. The program storage area 502 is stored with an information processing program such as an application program of a virtual game of this embodiment, and the information processing program includes a main processing program 502a, an image generation program 502b, an image display program 502c, a PC control program 502d, a map selection program 502e, a list display program 502f, a quest addition program 502g, a quest clear program 502h, a quest deletion program 502i, a reward giving program 502j, etc.

The main processing program 502a is a program for executing processing of a main routine (overall game processing) of the game application of this embodiment. The image generation program 502b is a program for generating, using image generation data 504 and referring to player data 504c as needed, data of a three-dimensional game image (the above-mentioned screen 100, etc.) and a two-dimensional game image (above-mentioned various types of screens 150, 200, 250, 300, etc.) (hereinafter, referred to as "game image data"). The image display program 502c is a program for outputting the game image data generated according to the image generation program 502b to the display 36. Therefore, the three-dimensional game image or the two-dimensional game image corresponding to the game image data is displayed on the display 36.

The PC control program 502d is a program for controlling an action or motion of the PC 102 according to an operation of the player. The map selection program 502e is a program for selecting a place that the PC 102 is to be moved, for selecting and executing the display of the list display screen 300, or for selecting to return to the game screen 100, in the map screen 200, according to an operation of the player. The list display program 502f is a program for displaying quests being had by each of one or more NPCs by list according to an operation of the player.

The quest addition program 502g is a program for assigning a quest to an NPC existing in each place when satisfying a predetermined condition. In this embodiment, when assigning a quest, the quest issued in the past by the NPC to which a quest is to be assigned and already cleared is excluded. Moreover, when assigning a quest, if a quest being had by the NPC to which a quest is to be assigned has never cleared, the quest may be replaced (or rewritten) with a quest being currently assigned.

The quest clear program 502h is a program for making the PC 102 clear a quest issued by the NPC according to an operation of the player. Specifically, when delivering an item that the NPC desired, the item delivered to the NPC is subtracted from the items possessed by the PC 102 by the delivered number. Moreover, when there is a question from the NPC, the PC 102 is made to answer the question according to an operation of the player.

The quest deletion program 502i is a program for deleting, when a quest issued by the NPC is cleared, the quest assigned to the NPC. The reward giving program 502j is a program for giving a reward that is determined in advance for the quest to the PC 102 in response to clearing the quest issued from the NPC by the first method or the second method.

Although illustration is omitted, the program storage area 502 is stored with other programs such as a communication program for performing communication with the server 12 and other game apparatuses, a program for saving (storing) the player data 504*c* (game data) in the flash memory 24, a sound output program for generating and outputting a sound required for the game, a program for controlling actions of NPCs (104, etc.), a program for making items appear or for arranging the items, etc.

The data storage area 504 is provided with an operation input data buffer 504*a*. Moreover, the data storage area 504 is stored with data such as image generation data 504*b*, player data 504*c*, all quest data 504*d*, all reward data 504*e*, etc.

The operation input data buffer 504*a* is an area for temporarily storing operation data from the input device 50. When an operation input is received by the CPU 20, the operation data is stored in the operation input data buffer 504*a* according to a time series, and if the operation data is used for the processing of the CPU 20, it will be deleted.

The image generation data 504*b* includes data for generating the game image data, such as polygon data, texture data, two-dimensional image data, etc. However, the two-dimensional image data is image data such as images of icons, face images, text images, etc. used in generating two-dimensional game image data.

The player data 504*c* is data (game data) about the player of the virtual game of this embodiment, and includes current position data 510, level data 512, possession item data 514 and NPC data 516.

Figure 11:
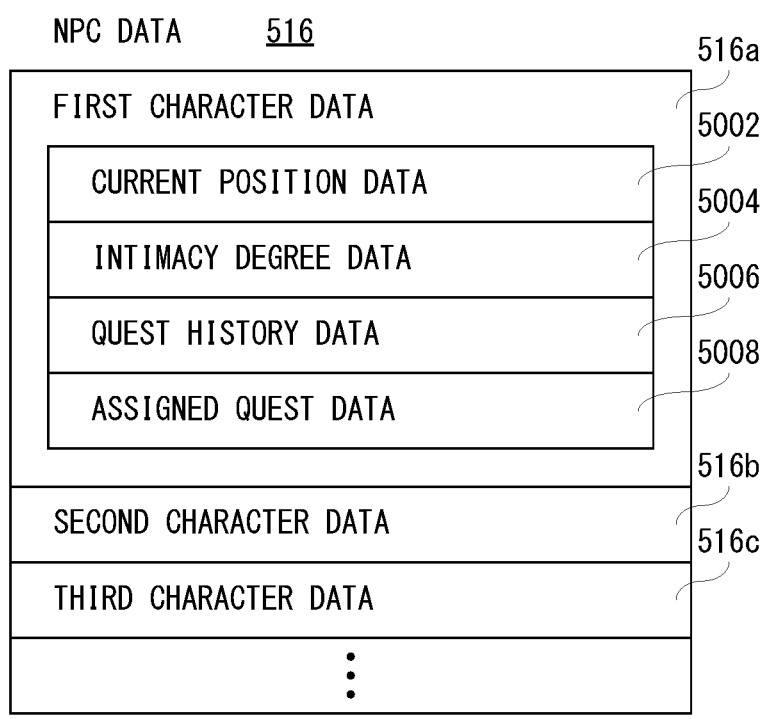
FIG. 11 is an illustration view showing non-limiting example contents of NPC data shown in FIG. 10.

The current position data 510 is coordinate data about a current position of the PC 102 in the virtual space. The level data 512 is data about a level of the PC 102 (or player) in the virtual game. The possession item data 514 is data about types and the number of items that the PC 102 (or player) possesses. The NPC data 516 is data about an NPC that may issue a quest to the PC 102. As shown in FIG. 11, the NPC data 516 includes data about each NPC (here, a first character, a second character, a third character, --). That is, the NPC data 516 includes first character data 516*a*, second character data 516*b*, third character data 516*c*, --.

The first character data 516*a* includes current position data 5002, intimacy degree data 5004, quest history data 5006 and assigned quest data 5008. The current position data 5002 is current position coordinate data of the NPC corresponding to the first character data 516*a* in the virtual space. However, when an NPC is not arranged in the virtual space, the current position data 5002 is not stored, or data (for example, null data) indicating that an NPC is not arranged in the virtual space is stored. The intimacy degree data 5004 is numerical data indicative of the intimacy degree between the PC 102 and the NPC corresponding to the first character data 516*a*. The quest history data 5006 is data about identification information on the quest cleared by the PC 102 out of the quests issued from the NPC corresponding to the first character data 516*a* to the PC 102. For example, the identification information of the quest is an inherent sign allotted to each quest, as mentioned later. The assigned quest data 5008 is data about the identification information of a quest currently assigned to the NPC corresponding to the first character data 516*a*. However, when no quest is assigned currently, the assigned quest data 5008 is not stored.

Although illustration is omitted, the second character data 516*b*, the third character data 516*c*, and -- are the same as the first character data 516*a*.

Returning to FIG. 10, all quest data 504*d* is data about all the quests prepared in advance in the virtual game. For example, the all quest data 504*d* is table data that specific content of each of the quests is described corresponding to each of the quest identification information. All reward data 504*e* is data about all the reward determined in advance corresponding to each of the quests. For example, the all reward data 504*e* is table data that specific content of each of the rewards is described corresponding to each of the quest identification information.

In addition, the all quest data 504*d* and the all reward data 504*e* can be added and rewritten by downloading from the server 12.

Although illustration is omitted, the data storage area 504 is stored with other data, and provided with a flag(s) and other counter(s) (timer(s)) required for the overall game processing (information processing).

FIG. 12-FIG. 20 are non-limiting example flow charts of the overall game processing of the CPU 20 shown in FIG. 2. For example, this overall game processing is started according to instructions by the user to execute the program of the game application that is a non-limiting example information processing. Moreover, although illustration is omitted, processing detecting an operation input of the player is executed in parallel to the overall game processing, and if an operation input of the player is detected, corresponding operation data is stored in the data storage area 504. However, the operation data is deleted after being used for processing of the CPU 20.

Figure 12:
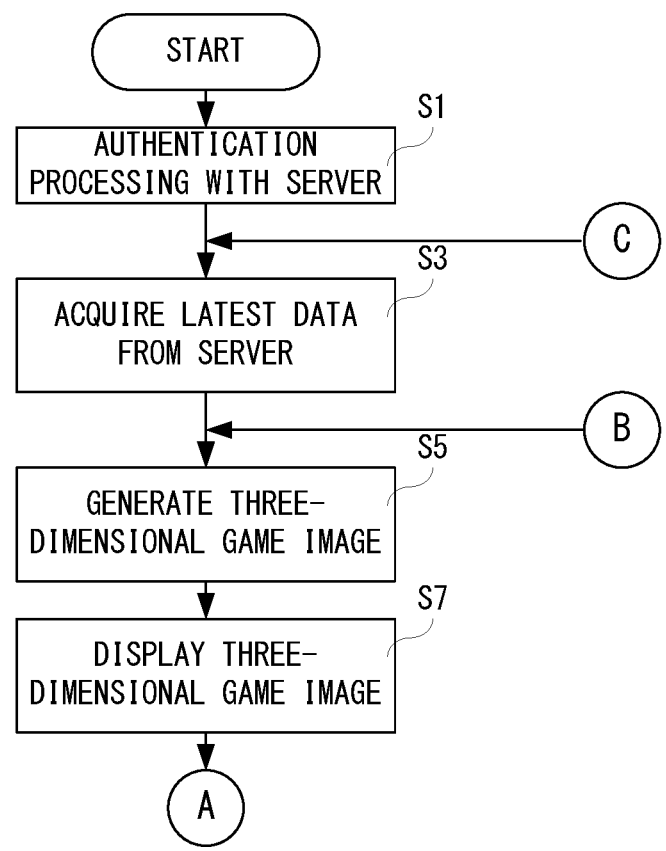
FIG. 12 is a flow chart showing a first part of non-limiting example overall game processing of a CPU incorporated in the game apparatus shown in FIG. 2.

As shown in FIG. 12, if the overall game processing is started, the CPU 20 executes, in a step S1, authentication processing with the server 12. Here, the CPU 20 communicably connects the first communication module 26 to the server 12 via the network 14, and transmits information of the game apparatus 16 or player and the player data 504*c* to the server 12.

When receiving the information of the game apparatus 16 or player and the player data 504*c*, the server 12 reads the player data that the server 12 manages corresponding to the information of the game apparatus 16 or player, and confirms whether the received player data 504*c* corresponds to the read player data.

When the received player data 504*c* and the read player data are in agreement, the authentication is successful, and this is transmitted to the game apparatus 16, whereby the game is continued. On the other hand, when the received player data 504*c* and the read player data are not in agreement, there is a possibility that the player data 504*c* (game data) is altered, and therefore, the authentication is not successful, and this is transmitted to the game apparatus 16. Although illustration is omitted, when the authentication is not successful, the overall game processing is forcibly terminated.

In a next step S3, the latest data is acquired from the server 12. The latest data includes data of a new item(s), data of an update program of the game program, etc. However, when there is no latest data, no data is acquired by game apparatuses 16 (or CPU 20).

In a subsequent step S5, a three-dimensional game image is generated. However, the game image is an image that the PC 102, the NPC(s) and the background object 106 of the place where the PC 102 currently exists are drawn three-dimensionally in the three-dimensional virtual space. In a next step S7, the three-dimensional game image is displayed. Therefore, the game screen 100 as shown in FIG. 3 and FIG. 4 is displayed on the display 36.

Figure 13:
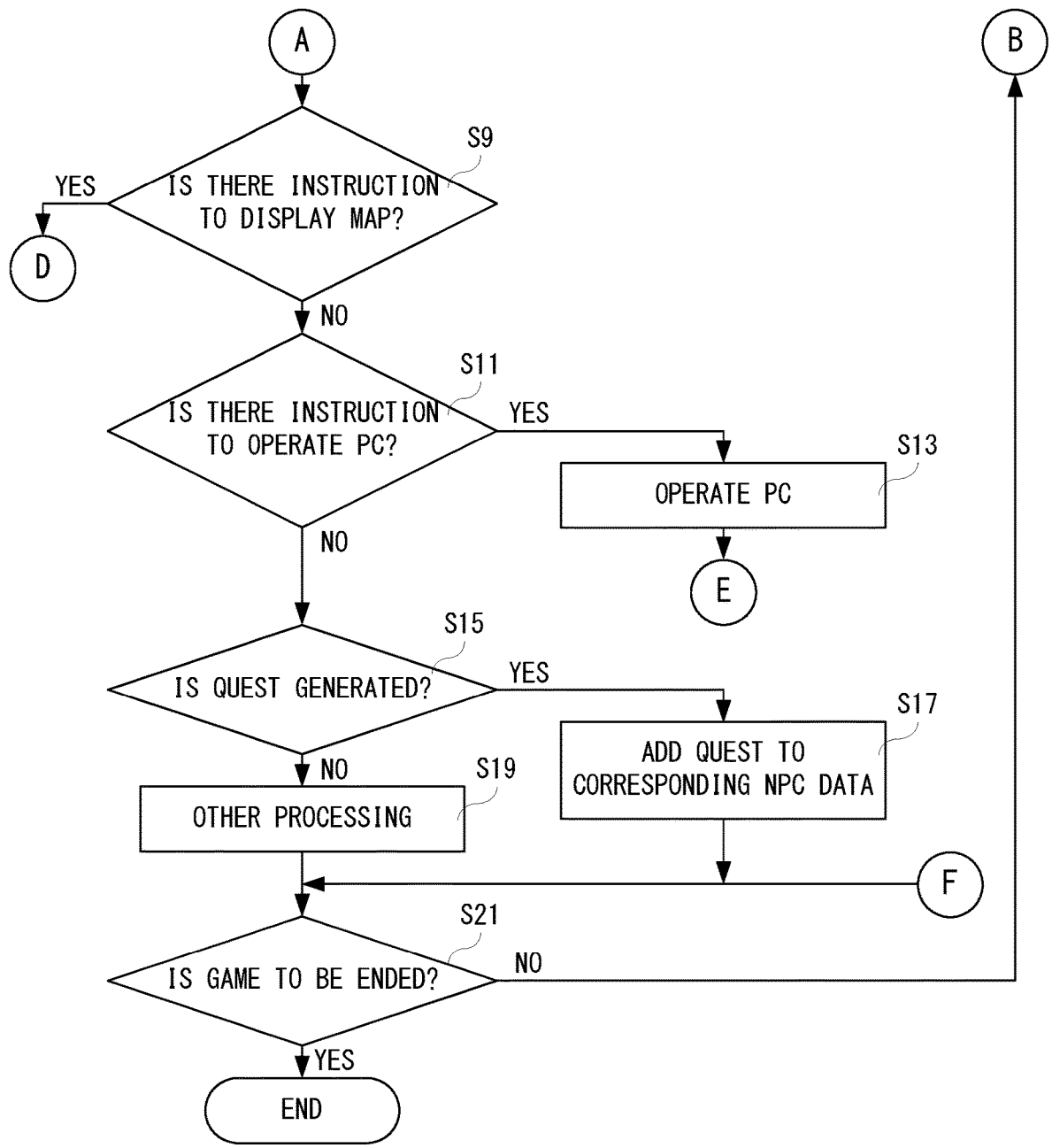
FIG. 13 is a flow chart showing a second part of the non-limiting example overall game processing of the CPU incorporated in the game apparatus shown in FIG. 2, following FIG. 12.

As shown in FIG. 13, in a next step S9, it is determined whether there is a display instruction of the map. Here, the CPU 20 determines, with reference to the data storage area

504, whether there is an operation input instructing to display the map. In the following, this is the same for a case of determination on whether there is any instruction from the player.

If "YES" is determined in the S9, that is, if there is the display instruction of the map, the process proceeds to a step S47 in FIG. 16 mentioned later. On the other hand, if "NO" is determined in the step S9, that is, if there is no display instruction of the map, it is determined, in a step S11, whether there is an action instruction to the PC 102.

Figure 14:
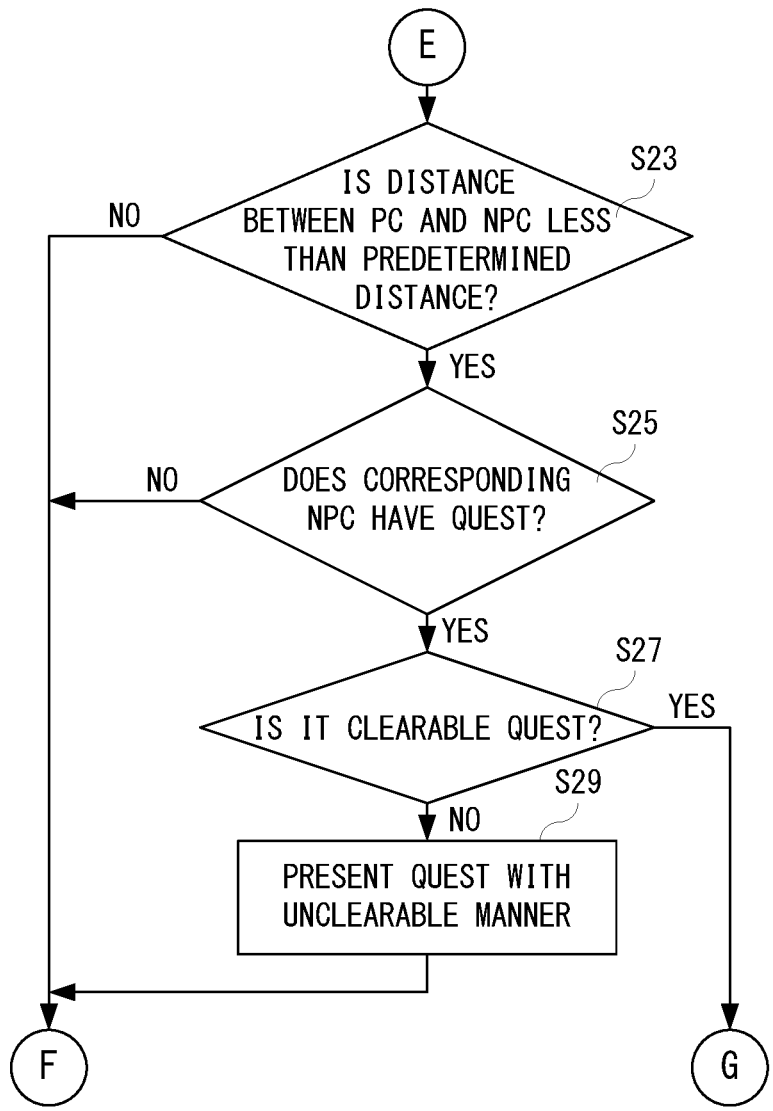
FIG. 14 is a flow chart showing a third part of the non-limiting example overall game processing of the CPU incorporated in the game apparatus shown in FIG. 2, following FIG. 13.
Figure 15:
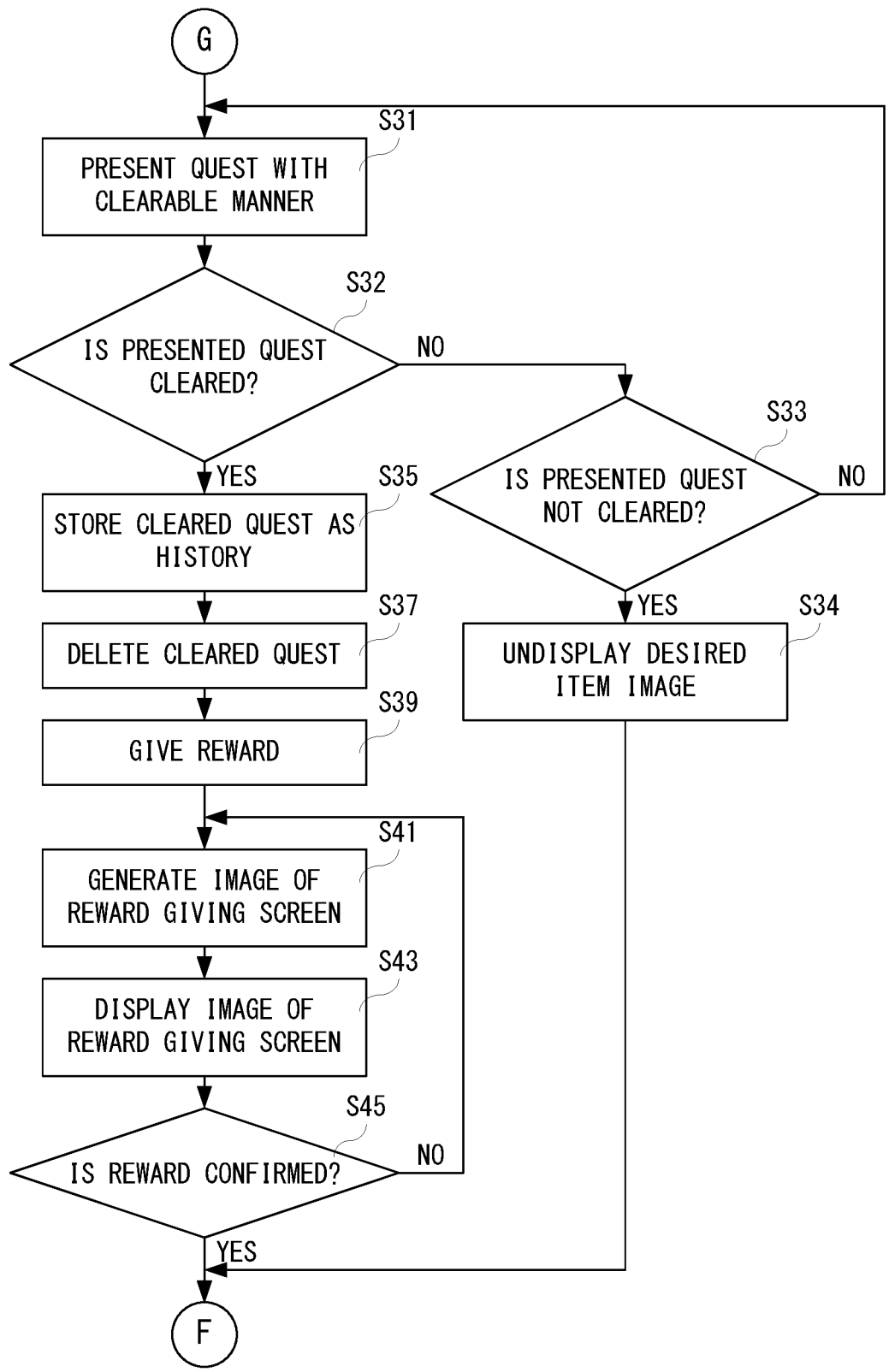
FIG. 15 is a flow chart showing a fourth part of the non-limiting example overall game processing of the CPU incorporated in the game apparatus shown in FIG. 2, following FIG. 14.

If "YES" is determined in the S11, that is, if there is the action instruction to the PC 102, the PC 102 is made to act according to an operation input of the player in a step S13, and the process proceeds to a step S23 shown in FIG. 14. In the step S13, an arbitrary action or motion is performed, such as moving the PC 102 or making the PC 102 acquire an item, or the like. When the PC 102 is moved, the current position (current position data 510) of the PC 102 is updated. Moreover, when an item is acquired, the possession item (possession item data 514) is updated or added.

On the other hand, if "NO" is determined in the step S11, that is, if there is no action instruction to the PC 102, it is determined, in a step S15, whether a quest is to be generated. In this embodiment, in the step S15, the CPU 20 determines whether a predetermined time period (for example, 3 hours) elapses from the time when a quest generated last time, or whether the PC 102 uses a predetermined item. However, the predetermined time period may be real time or virtual time in the virtual game.

If "YES" is determined in the S15, that is, if a quest is to be generated, in a step S17, a quest is added to corresponding character data (that is, any of the first character data 516a, the second character data 516b, --), and the process proceeds to a step S21. In the step S17, the assigned quest data about an NPC determined that a quest is to be issued (the assigned quest data 5008 for the first character data 516a) is stored.

On the other hand, if "NO" is determined in the step S15, that is, if a quest is not to be generated, other processing is executed in a step S19, and the process proceeds to the step S21. In the step S19, the CPU20 executes other game control processing, such as causing an NPC to action, making an item appear, etc. In addition, when an NPC is moved, a current position (current position data 5002, etc.) of the corresponding NPC is updated.

In the step S21, it is determined whether the game is to be ended. Here, the CPU 20 determines whether the player instructs to end the game. If "NO" is determined in the step S21, that is, if the game is not to be ended, the process returns to the step S5 shown in FIG. 12. On the other hand, if "YES" is determined in the S21, that is, if the game is to be ended, the overall game processing is terminated.

In the step S23 shown in FIG. 14, it is determined whether a distance between the PC 102 and an NPC is less than the predetermined distance. If "NO" is determined in the step S23, that is, if the distance between the PC 102 and an NPC is equal to or more than the predetermined distance, the process returns to the step S21 shown in FIG. 13.

On the other hand, if "YES" is determined in the S23, that is, if the distance between the PC 102 and an NPC is less than the predetermined distance, it is determined, in a step S25, whether the corresponding NPC has a quest. In this step S25, the CPU 20 determines, with reference to the NPC data 516 included in the player data 504c, whether the assigned quest data is stored in the character data corresponding to the NPC.

If "NO" is determined in the step S25, that is, if the NPC does not have a quest, the process returns to the step S21. On the other hand, if "YES" is determined in the S25, that is, if the NPC has a quest, it is determined, in a step S27, whether the quest is a clearable quest.

If "NO" is determined in the step S27, that is, if the quest is an unclearable quest, after the quest is presented in an unclearable manner in a step S29, the process proceeds to the step S21 shown in FIG. 13. On the other hand, if "YES" is determined in the S27, that is, if the quest is a clearable quest, the quest is presented in a clearable manner in a step S31 shown in FIG. 15. Here, the game screen 100 as shown in FIG. 4 is displayed on the display 36.

Subsequently, it is determined, in a step S32, whether the presented quest is cleared. For example, in the game screen 100 shown in FIG. 4, the CPU 20 determines whether the icon 126 of the desired item image 120 is operated.

If "NO" is determined in the step S32, that is, if the presented quest is not cleared, it is determined, in a step S33, whether the presented quest will not be cleared. For example, in the game screen 100 shown in FIG. 4, the CPU 20 determines whether the icon 124 of the desired item image 120 is operated.

If "YES" is determined in the S33, that is, if the presented quest will not be cleared, the desired item image 120 is undisplayed in a step S34, and the process proceeds to the step S21. On the other hand, if "NO" is determined in the step S33, that is, if the presented quest will be cleared, the process returns to the step S31.

Moreover, if "YES" is determined in the S32, that is, if the presented quest is cleared, the cleared quest is stored as a history in a step S35. Here, the CPU 20 adds the identification information of the cleared quest to the quest history data included in the character data that the assigned quest data on the cleared quest stores. Although illustration is omitted, when the PC 102 delivers the item(s) desired by the NPC by the desired number, the desired number of the item(s) are subtracted from the possession item (possession item data 514). However, subtraction of the possession item may be executed at a proper timing until the process is shifted to steps S32-S47. These are the same also for a case where a quest is cleared by the second method (steps S101-S111 and S83, mentioned later).

In a subsequent step S37, the quest having been cleared is deleted. That is, the CPU 20 deletes the assigned quest data about the quest having been cleared from the character data. In a next step S39, a reward is given to the PC 102 (or player). At this time, the CPU 20 recognizes, with reference to the all reward data 504e, a reward to be given to the cleared quest, and gives the recognized reward to the PC 102. Therefore, data about the given reward is added to the possession item data 514 included in the player data 504c. That is, the possession item data 514 is updated.

Subsequently, an image of the reward confirmation screen 150 as shown in FIG. 5 is generated in a step S41, and the reward confirmation screen 150 is displayed on the display 36 in a step S43. Then, it is determined, in a step S45, whether the content of the reward is confirmed. Here, the CPU 20 determines whether the icon 160 is operated in the reward confirmation screen 150.

If "NO" is determined in the step S45, that is, if it determined that the content of the reward is not confirmed, the process returns to the step S39. On the other hand, if "YES" is determined in the S45, that is, if it is determined that the content of the reward is confirmed, the process returns to the step S21. At this time, the reward confirmation screen 150 is undisplayed, and the game screen 100 is displayed on the display 36.

In addition, the processing of steps S35-S45 are the same as those of steps S101-S111 mentioned later.

Figure 16:
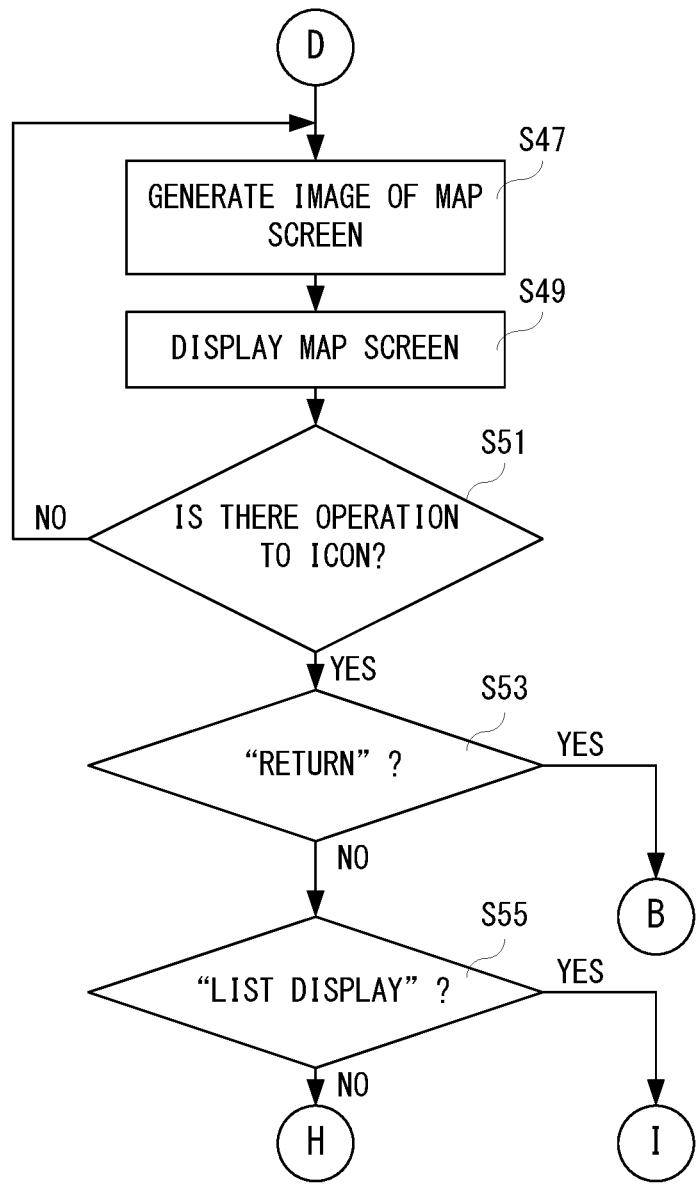
FIG. 16 is a flow chart showing a fifth part of the non-limiting example overall game processing of the CPU incorporated in the game apparatus shown in FIG. 2, following FIG. 13.
Figure 17:
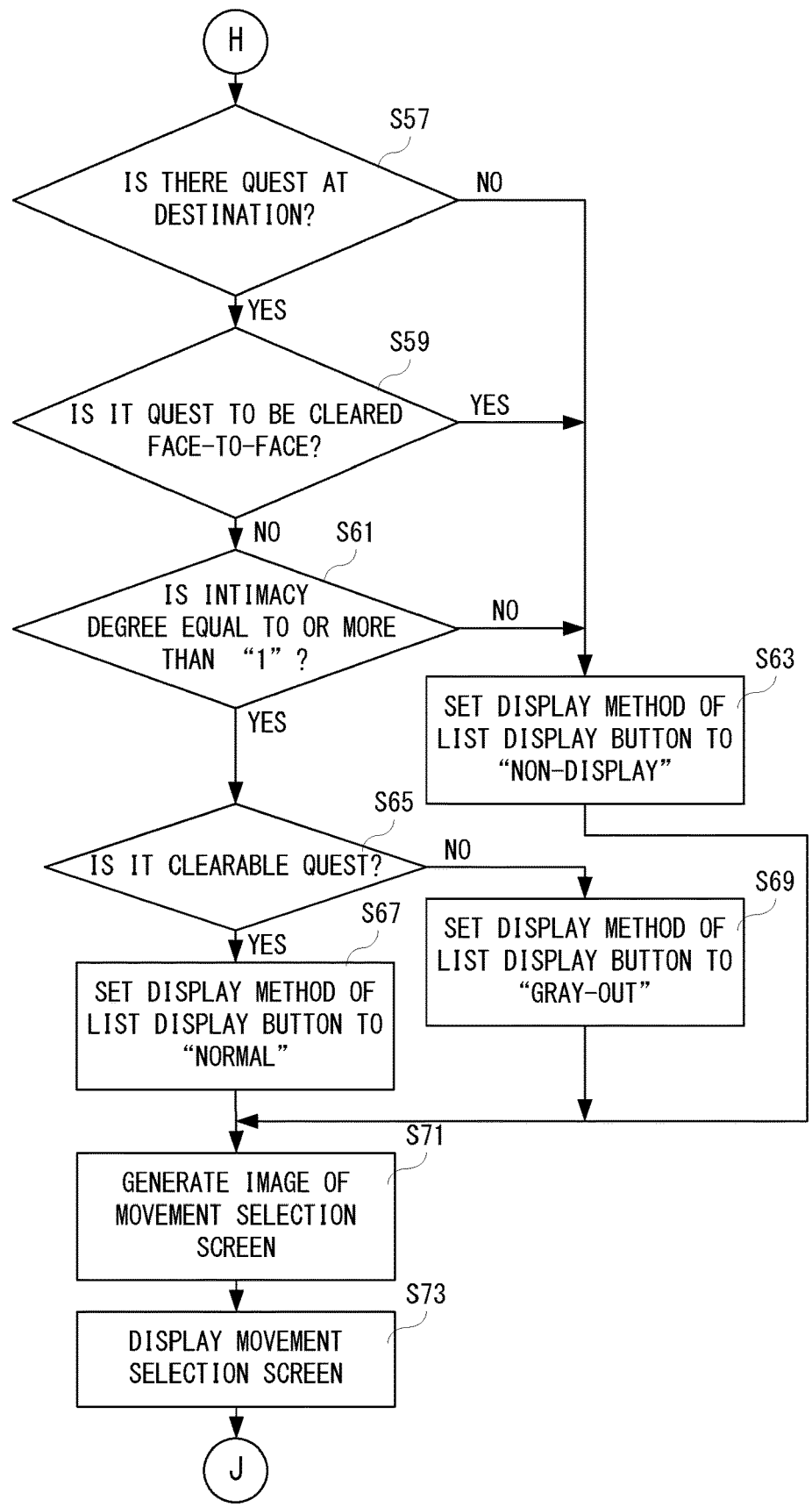
FIG. 17 is a flow chart showing a sixth part of the non-limiting example overall game processing of the CPU incorporated in the game apparatus shown in FIG. 2, following FIG. 16.

As mentioned above, if there is the displaying instruction of the map, "YES" is determined in the step S9 in FIG. 13, and the image of the map screen 200 as shown in FIG. 6 is generated in the step S47 shown in FIG. 16, and the map screen 200 is displayed on the display 36 in a step S49. At this time, the CPU 20 acquires, with reference to the player data 504c, the current position of the PC 102 and the current position of each NPC, and displays the face image of the PC 102, and each face images of each of one or more NPCs in the map screen 200.

In a next step S51, it is determined whether there is any operation to the icon 210, 212, 214, 216, 218, 220 or 222. If "NO" is determined in the step S51, that is, if there is no operation to the icon 210, 212, 214, 216, 218, 220 or 222, the process returns to the step S47. On the other hand, if "YES" is determined in the S51, that is, there is an operation to the icon 210, 212, 214, 216, 218, 220 or 222, it is determined, in a step S53, whether the display is to be returned to the game screen 100. Here, the CPU 20 determines whether the icon 222 is operated.

If "YES" is determined in the S53, that is, if to be returned to the game screen 100, the process returns to the step S5 shown in FIG. 12. At this time, the map screen 200 is undisplayed. On the other hand, if "NO" is determined in the step S53, that is, if not to be returned to the game screen 100, it is determined, in a step S55, whether it is a list display. Here, the CPU 20 determines whether the icon 220 is operated.

Figure 19:
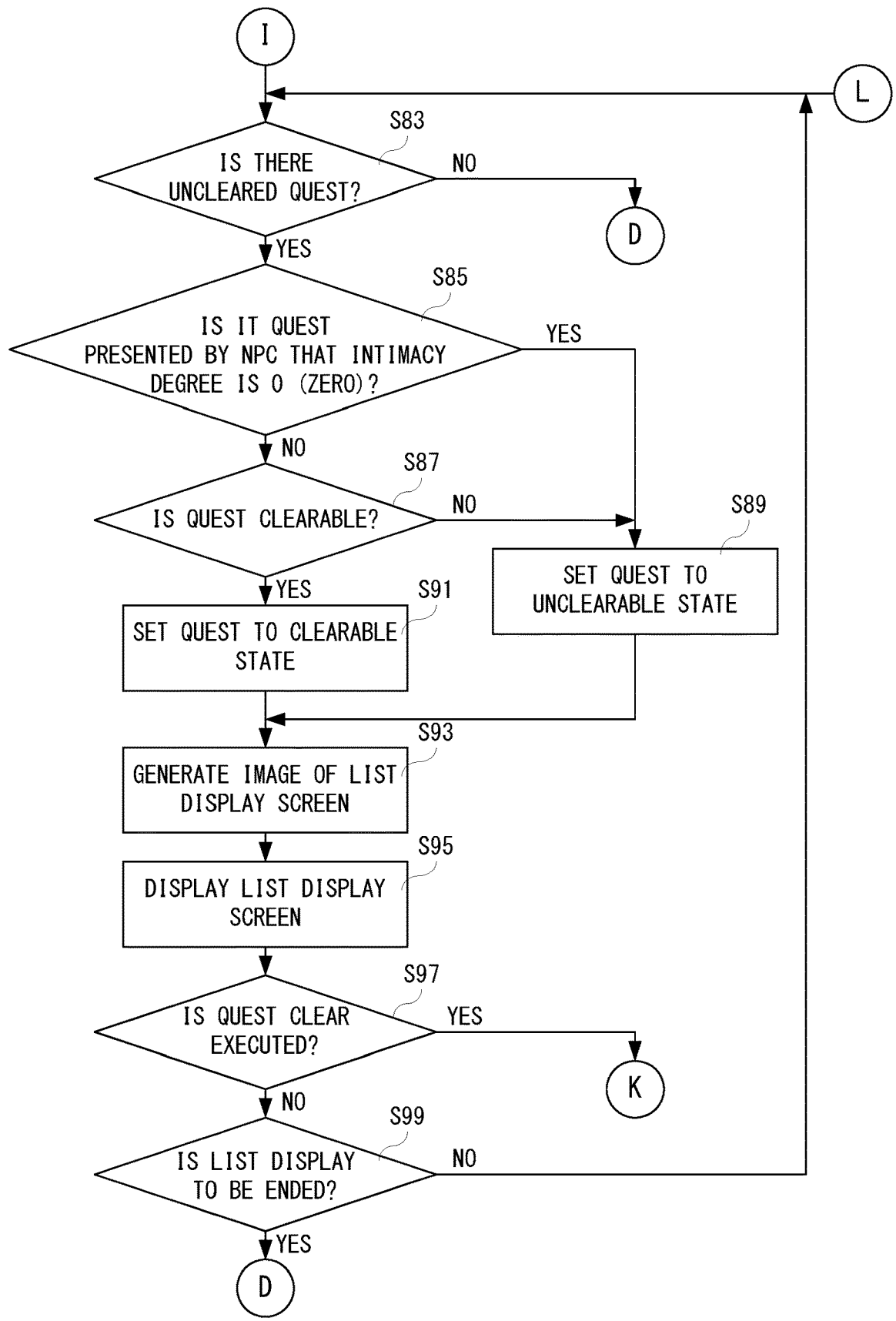
FIG. 19 is a flow chart showing a eighth part of the non-limiting example overall game processing of the CPU incorporated in the game apparatus shown in FIG. 2, following FIG. 16 and FIG. 18.

If "YES" is determined in the S55, that is, it is a list display, the process proceeds to a step S83 shown in FIG. 19. On the other hand, if "NO" is determined in the step S55, that is, if it is not a list display, it is determined that it is a place movement, and it is determined, in a step S57 shown in FIG. 17, whether there is a quest in a movement destination. Here, the CPU 20 determines, with reference to the player data 504c, whether the assigned quest data is included in the character data corresponding to the NPC existing in the place of the movement destination.

If "NO" is determined in the step S57, that is, if there is no quest in the movement destination, a display method of a list display button, i.e., the icon 264 is set as "non-display" in a step S63, and the process proceeds to a step S71. On the other hand, if "YES" is determined in the S57, that is, if there is a quest in the movement destination, it is determined, in a step S59, whether the quest is a quest that should be cleared face-to-face. If "YES" is determined in the S59, that is, if the quest is a quest that should be cleared face-to-face, the process proceeds to a step S63. On the other hand, if "NO" is determined in the step S59, that is, if the quest is not a quest that should be cleared face-to-face, it is determined, in a step S61, whether the intimacy degree with the NPC having the quest is equal to or more than 1 (one). Here, the CPU 20 determines whether the numerical value indicated by the intimacy degree data of the character data that includes the assigned quest data of the quest is equal to or more than 1.

If "NO" is determined in the step S61, that is, if the intimacy degree is 0 (zero), the process proceeds to the step S63. On the other hand, if "YES" is determined in the S61, that is, if the intimacy degree is equal to or more than 1, it is determine, in a step S65, whether the quest is a clearable quest. If "YES" is determined in the S65, that is, if the quest is a clearable quest, the display method of the list display button is set as "normal" in a step S67, and the process proceeds to a step S71. On the other hand, if "NO" is determined in the step S65, that is, if the quest is an unclearable quest, the display method of the list display button is set as "grayout" in a step S69, and the process proceeds to the step S71.

In the step S71, an image of the movement selection screen 250 is generated. At this time, the display of the list display button is controlled according to a setup in the step S63, S67 or S69. In a subsequent step S73, the movement selection screen 250 as shown in FIG. 7 is displayed on the display 36. However, when the display method of the list display button is set as "non-display", the icon 264 is undisplayed in the movement selection screen 250. Moreover, when the display method of the list display button is set as "grayout", the icon 264 is displayed by grayout in the movement selection screen 250.

Figure 18:
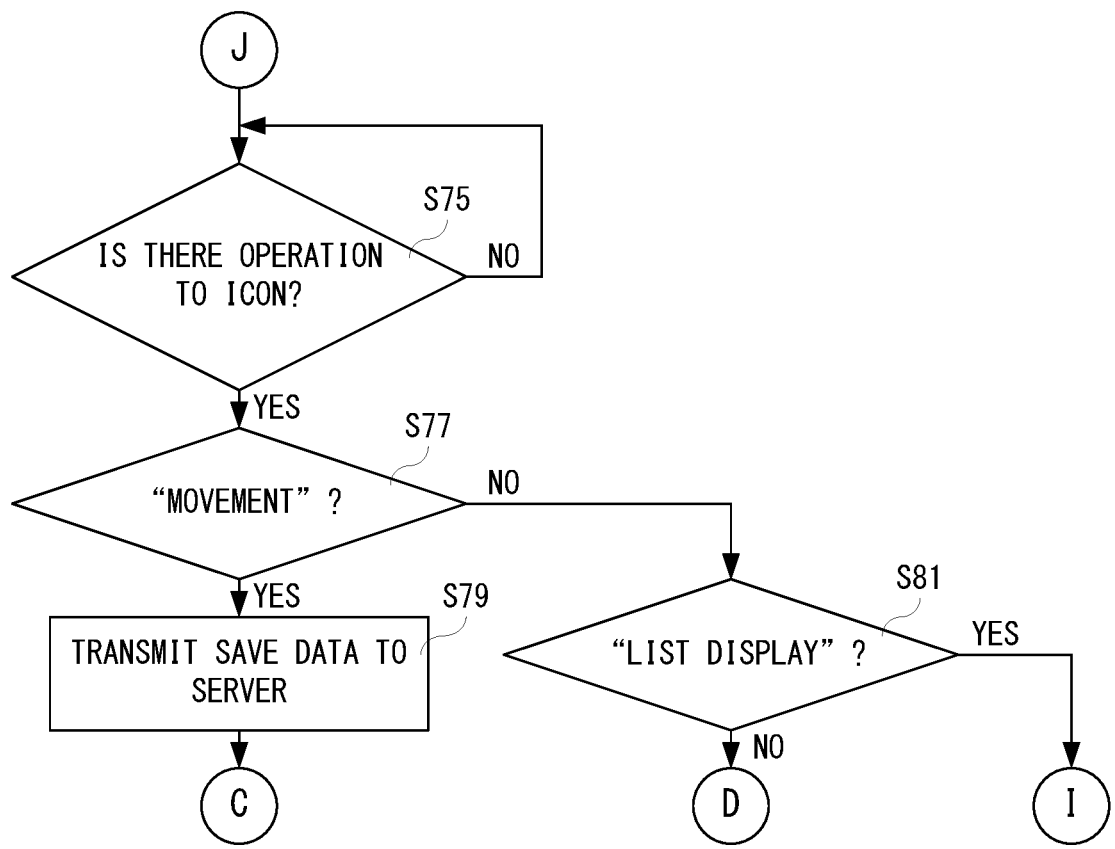
FIG. 18 is a flow chart showing a seventh part of the non-limiting example overall game processing of the CPU incorporated in the game apparatus shown in FIG. 2, following FIG. 17.

As shown in FIG. 18, in a next step S75, it is determined whether the icon 260, 262 or 264 is operated. If "NO" is determined in the step S75, that is, if the icon 260, 262 or 264 is not operated, the process returns to the step S75. On the other hand, if "YES" is determined in the S75, that is, if the icon 260, 262 or 264 is operated, it is determined, in a step S77, whether it is a movement. Here, the CPU 20 determines whether the icon 260 is operated (or turned on). If "YES" is determined in the S77, that is, if it is a movement, the save data (in this embodiment, player data 504c) is transmitted to the server 12 in a step S79, and the process returns to the step S3 shown in FIG. 12. On the other hand, if "NO" is determined in the step S75, that is, if it is not a movement, it is determined, in a step S81, whether it is a list display. Here, the CPU 20 determines whether the icon 264 that is normally displayed is turned on.

If "YES" is determined in the S81, that is, it is a list display, the process proceeds to the step S83 shown in FIG. 19. On the other hand, if "NO" is determined in the step S81, it is determined that the icon 262 is turned on and that the display should be returned to the map screen 200, and the process returns to the step S47 shown in FIG. 16.

If "NO" is determined in the step S81, that is, if returning to the map screen 200 is not instructed, the process returns to the step S73. On the other hand if "YES" is determined in the S79, that is, if returning to the map screen 200 is instructed, the process returns to the step S47 shown in FIG. 16.

As mentioned above, if "YES" is determined in the step S51 or the step S77, it is determined, in the step S83 shown in FIG. 19, whether there is a quest that is uncleared. Here, the CPU 20 determines, with reference to the player data 504c, whether there is any character data including the assigned quest data in the NPC data 516. If "NO" is determined in the step S83, that is, if there is not a quest that is uncleared, it is determined that there are no contents to be displayed by list, and the process returns to the step S47 (i.e., the map screen 200).

On the other hand, if "YES" is determined in the S83, that is, if there is a quest that is uncleared, it is determined, in a step S85, whether the quest is a quest issued by an NPC that the intimacy degree is 0 (zero). Here, the CPU 20 determines whether the numerical value indicated by the intimacy degree data included in the character data including the assigned quest data is 0.

If "YES" is determined in the S85, that is, if the quest is a quest issued by an NPC that the intimacy degree is 0, the quest is set in an unclearable state in a step S89, and the process proceeds to a step S93. On the other hand, if "NO"

is determined in the step S85, that is, if the quest is a quest issued by an NPC that the intimacy degree is equal to or more than 1 (one), it is determined, in a step S87, whether the quest is clearable.

If "NO" is determined in the step S87, that is, if the quest is unclearable, the process proceeds to the step S89. On the other hand, if "YES" is determined in the S87, that is, if the quest is clearable, the quest is set in a clearable state in a step S91, and the process proceeds to the step S93.

Although illustration and detailed description are omitted, the processing of each of the steps S85-S91 is executed for each quest.

In the step S93, the image of the list display screen 300 as shown in FIG. 8 is generated. However, as to the quest that is set in the unclearable state, an icon for instructing to execute clearing of the quest is displayed by grayout. Moreover, a reason why the quest is unclearable is referred to, and the content thereof is indicated above the icon.

Subsequently, in a step S95, the list display screen 300 is displayed, and it is determined, in a step S97, whether the clearing of the quest is to be executed. In the list display screen 300 shown in FIG. 8, it is determined whether the icon 320 is turned on. If "NO" is determined in the step S97, that is, if not executing the clearing of the quest, it is determined, in a step S99, whether the list display is to be ended. Here, the CPU 20 determines whether the icon 350 is turned on. If "NO" is determined in the step S99, that is, if the list display is not to be ended, the process returns to the step S83. On the other hand, if "YES" is determined in the S99, if the list display is to be ended, the process returns to the step S47.

Figure 20:
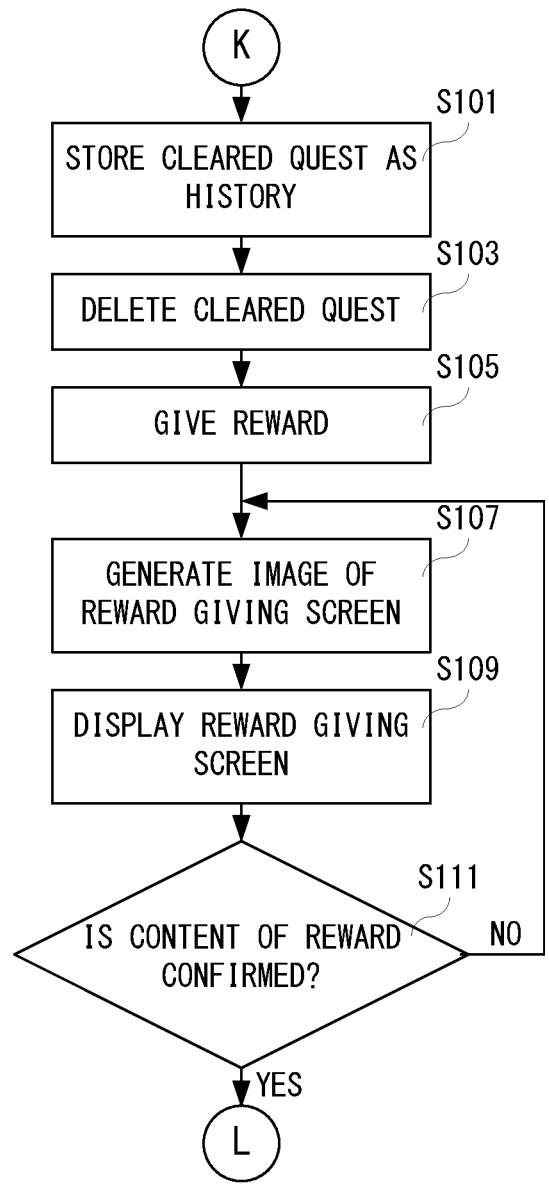
FIG. 20 is a flow chart showing a ninth part of the non-limiting example overall game processing of the CPU incorporated in the game apparatus shown in FIG. 2, following FIG. 19.

Moreover, if "YES" is determined in the S97, that is, if the clearing of the quest is to be executed, the cleared quest is stored as the history of the cleared quest in a step S101 shown in FIG. 20. In a subsequent step S103, the cleared quest is deleted, and a reward is given to the PC 102 (or player) in a step S105. Subsequently, in a step S107, the image of the reward confirmation screen 150 as shown in FIG. 5 is generated, and the reward confirmation screen 150 is displayed on the display 36 in a step S109. Then, it is determined, in a step S111, whether the content of the reward is confirmed.

If "NO" is determined in the step S111, the process returns to the step S107. On the other hand, if "YES" is determined in the S111, that is, if it is determined that the content of the reward is confirmed, the process returns to the step S83 shown in FIG. 19. At this time, the reward confirmation screen 150 is undisplayed, and the game screen 100 is displayed on the display 36.

According to this embodiment, since a quest can be cleared by displaying the quest(s) by list, it is possible to save the trouble of moving to a place where an NPC having a quest exists. That is, it is possible to improve usability.

Moreover, according to this embodiment, since a quest can be cleared in the list display screen other than the place where the NPC having a quest exists, it is possible to clear the quest by a method that the user desires.

Furthermore, according to this embodiment, since the quest(s) can be cleared by displaying the quest(s) by list, it is not necessary to move to a place where an NPC having a quest exists, and thus, there is no need to draw an image corresponding to the three-dimensional game screen at every time of moving to the place where an NPC exists.

Accordingly, it is possible to reduce the CPU utilization, whereby the power consumption can be reduced.

In addition, in this embodiment, the quest history data and the assigned quest data are included in the character data of the NPC, and when the quest is cleared by the first method or the second method, the quest history data is updated and the assigned quest data is deleted; however, the quest may be managed in different manner when cleared by the first method or when cleared by the second method. In such a case, when a quest is cleared by one method, execution of the clearing of the quest by the other method is restricted.

Moreover, as a quest issued by an NPC, it is exemplified that the NPC requests desired item by the desired number and that the NPC asks the PC or player a question in this embodiment, but it does not need to be limited to this. For example, as other quest(s), it may be issuing quiz to the PC or player by an NPC, playing an arbitrary mini game, etc.

Furthermore, although a case where an NPC imitating a human being issues a quest is described in this embodiment, other NPC(s) or object(s) existing in the virtual space may issue a quest. For example, an NPC may be a character imitating an animal or an animation character. Moreover, in another embodiment, a quest may be issued in response to the PC touches to or approaches a predetermined object (for example, a virtual sword, a virtual jewelry) arranged in the virtual space.

Furthermore, the server manages the information of the game apparatus or player and the player data, and the authentication processing at the time of start of the virtual game is executed in this embodiment using these information and data, but it does not need to be limited to this. It is conceivable that the server receives the operation data from the game apparatus and executes the overall game processing partly or wholly, and then, sends a processing result to the game apparatus. In such a case, the player data may be downloaded from the server rather than saving in the game apparatus. Moreover, the server may be omitted so that a virtual game can be played by the game apparatus alone.

Moreover, the content of game, the configuration of the game apparatus and specific numeral values shown in this embodiment are mere examples and can be appropriately changed according to actual products.

Furthermore, as long as the same effect (result) is obtained, the order of respective steps shown in the flow charts may be appropriately changed.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system, comprising:
a processor; and
a memory configured to store computer readable instructions that, when executed, cause the information processing system to:
control, based on an operation by a user, an action of a user object in one space among two or more virtual spaces or one area among two or more areas within a virtual space, wherein the user object is associated with a player character;
execute, in a first scene where an event object and the user object are arranged in a predetermined positional relationship, an event related to the event object, wherein
the first scene corresponds to a location where the event object is located in the virtual space, the event object is associated with a quest completable by the player character and issued by a non-player character, and the first scene where the event object and the user object are arranged in the predetermined positional relationship includes a distance between the player character and the non-player character becoming less than a specified distance;

present to the user, in a second scene different from the first scene, event object information related to a plurality of event objects respectively arranged in the two or more virtual spaces or in the two or more areas, wherein the event object information is associated with the on-player character, from a plurality of non-player characters, and the second scene includes a user interface displayed over a scene of the virtual space and the user interface includes a list display screen including items associated with the quest issued by the non-player character; and execute the event related to the event object information in the second scene in response to selection of an item associated with the quest issued by the non-player character, wherein execution of the event in the second scene occurs without requiring the user object to move to the location where the event object is located in the virtual space, wherein a reward is given when the quest is completed.

2. The information processing system according to claim 1, wherein in the second scene, the event object information respectively related to the plurality of event objects arranged in the two or more virtual spaces are presented to the user in a selectable manner.

3. The information processing system according to claim 1, wherein the information processing system is further caused to shift to the second scene based on an operation by the user in the first scene.

4. The information processing system according to claim 1, wherein the information processing system is further caused to shift to the first scene based on an operation by the user in the second scene.

5. The information processing system according to claim 1, wherein the information processing system is further caused to present to the user an icon indicating a virtual space in the second scene, and the user object is arranged in the virtual space in response to an operation by the user to the icon in the second scene.

6. The information processing system according to claim 5, wherein two or more icons each indicating each of two or more virtual spaces are presented to the user in the second scene, and the user object is arranged in the virtual space indicated by the icon operated by the user among the two or more icons.

7. The information processing system according to claim 1, wherein an event related to the event object is executed in the first scene within a three-dimensional virtual space where the event object is arranged, and an event related to the event object is executed in the second scene within a two-dimensional virtual space.

8. The information processing system according to claim 1, wherein the information processing system is further caused to restrict, if an event is executed in the first scene or if an event is executed in the second scene, execution of the event.

9. The information processing system of claim 1, wherein the information processing system is further caused to make, if an event is executed in the first scene or if an event is executed in the second scene, an event different from the event be executable in the first scene and the second scene.

10. The information processing system of claim 1, wherein a same reward is given to the user in either a case where an event is executed in the first scene or a case where the event is executed in the second scene.

11. The information processing system of claim 1, wherein an item related to the event can be acquired by the user in the first scene.

12. A non-transitory computer readable storage medium storing an information processing program that is executable by a computer having one or more processors, wherein the information processing program causes the one or more processors to provide execution comprising:

controlling, based on an operation by a user, an action of a user object in one space among two or more virtual spaces or one area among two or more areas within a virtual space, wherein the user object is associated with a player character;

executing, in a first scene where an event object and the user object are arranged in a predetermined positional relationship, an event related to the event object, wherein the first scene corresponds to a location where the event object is located in the virtual space, the event object is associated with a quest compatable by the player character and issued by a non-player character, and the first scene where the event object and the user object are arranged in the predetermined positional relationship includes a distance between the player character and the non-player character becoming less than a specified distance;

presenting to the user, in a second scene different from the first scene, event object information related to a plurality of event objects respectively arranged in the two or more virtual spaces or in the two or more areas, wherein the event object information is associated with the non-player character from a plurality of non-players characters, and the second scene includes a user interface displayed over a scene of the virtual space and the user interface includes a list display screen including items associated with the quest issued by the non-player character; and executing the event related to the event object information in the second scene in response to selection of an item associated with the quest issued by the non-player character, wherein a reward is given when the quest is completed.

13. An information processing apparatus, comprising:
a display device; and
processing circuitry including one or more processors, wherein the processing circuitry is configured to:

control, based on an operation by a user, an action of a user object in one space among two or more virtual spaces or one area among two or more areas within a virtual space, wherein the user object is associated with a player character;

execute, in first scene where an event object and the user object are arranged in a predetermined positional relationship, an event related to the event object, wherein the first scene corresponds to a location where the event object is located in the virtual space, the event object is associated with a quest completable by the player character and issued by a non-player character, and the first scene where the event object and the user object are arranged in the predetermined positional relationship includes a distance between the player character and the non-player character becoming less than a specified distance;

present to the user, in a second scene different from the first scene, event object information related to a plurality of event objects respectively arranged in the two or more virtual spaces or in the two or more areas, wherein the event object information is associated with eh non-player character from a plurality of non-player characters, and the second scene includes a user interface displayed over a scene of the virtual space and the user interface includes a list display screen including items associated with the quest issued by the non-player character; and execute the event related to the event object information in the second scene in response to selection of an item associated with the quest issued by the non-player character, wherein a reward is given when the quest is completed.

14. An information processing method, comprising:

controlling, based on an operation by a user, an action of a user object in one space among two or more virtual spaces or one area among two or more areas within a virtual space, wherein the user object is associated with a player character;

executing, in first scene where an event object and the user object are arranged in a predetermined positional relationship, an event related to the event object, wherein the first scene corresponds to a location where the event object is located in the virtual space, the event object is associated with a quest completable by the player character and issued by a non-player character, and the first scene where the event object and the user object are arranged in the predetermined positional relationship includes a distance between the player character and the non-player character becoming less than a specified distance;

presenting to the user, in a second scene different from the first scene, event object information related to a plurality of event objects respectively arranged in the two or more virtual spaces or in the two or more areas, wherein the event object information is associated with the non-player character from a plurality of non-player character; and the second scene includes a user interface displayed over a scene of the virtual space and the user interface includes a list display screen including items associated with the quest issued by the non-player character; and executing the event related to the event object information in the second scene in response to selection of an item associated with the quest issued by the non-player character, wherein a reward is given when the quest is completed.

15. The information processing system of claim 1, wherein an intimacy degree is associated between the player character and each of the non-player characters.

16. The information processing system of claim 15, wherein the intimacy degree for each of the non-player character is set to 0, and the intimacy degree of a first non-player character, from the plurality of non-player characters, is set to 1 in association with the player character interacting with the first non-player character.

17. The information processing system of claim 16, wherein the intimacy degree of the first non-player character is set to 1 when the player character has a conversation with the first non-player character.

18. The information processing system of claim 16, wherein the intimacy degree of the first non-player character is set to 1 when the player character clears a quest issued by the first non-player character.

19. The information processing system of claim 16, wherein a quest issued by a non-player character having an intimacy degree of 0 with the player character is unable to be cleared, and the quest issued by the non-player character having the intimacy degree of 0 with the player character is cleared when the intimacy degree is equal to or more than a predetermined value.

* * * * *